(12) United States Patent
Moon et al.

(10) Patent No.: US 10,805,607 B2
(45) Date of Patent: Oct. 13, 2020

(54) VIDEO SIGNAL ENCODING/DECODING METHOD AND APPARATUS

(71) Applicant: Industry Academy Cooperation Foundation of Sejong University, Seoul (KR)

(72) Inventors: Joo Hee Moon, Seoul (KR); Sung Won Lim, Seoul (KR); Dong Jae Won, Goyang-si (KR)

(73) Assignee: Industry Academy Cooperation Foundation of Sejong University, Seoul (KR)

( * ) Notice: Subject to any disclaimer, the term of this patent is extended or adjusted under 35 U.S.C. 154(b) by 0 days.

(21) Appl. No.: 16/097,394

(22) PCT Filed: Apr. 28, 2017

(86) PCT No.: PCT/KR2017/004576
§ 371 (c)(1),
(2) Date: Oct. 29, 2018

(87) PCT Pub. No.: WO2017/188784
PCT Pub. Date: Nov. 2, 2017

(65) Prior Publication Data
US 2019/0149821 A1    May 16, 2019

(30) Foreign Application Priority Data

Apr. 29, 2016  (KR) .................... 10-2016-0052692
Apr. 29, 2016  (KR) .................... 10-2016-0052925

(Continued)

(51) Int. Cl.
*H04N 19/119*  (2014.01)
*H04N 19/105*  (2014.01)
(Continued)

(52) U.S. Cl.
CPC ......... *H04N 19/119* (2014.11); *H04N 19/105* (2014.11); *H04N 19/107* (2014.11);
(Continued)

(58) Field of Classification Search
CPC .. H04N 19/119; H04N 19/105; H04N 19/107; H04N 19/136; H04N 19/176; H04N 19/463; H04N 19/70
(Continued)

(56) References Cited

U.S. PATENT DOCUMENTS 9,196,059 B2   11/2015   Jeon et al.
2010/0086029 A1   4/2010   Chen et al.
(Continued)

FOREIGN PATENT DOCUMENTS

KR   10-2011-0117075 A   10/2011
KR   10-2012-0003406 A   1/2012
(Continued)

*Primary Examiner* — Patricia I Young
(74) *Attorney, Agent, or Firm* — NSIP Law

(57) ABSTRACT

An image signal decoding method according to the present invention comprises the steps of: decoding information indicating whether a current block is encoded using a multi-mode intra prediction; when it is determined that the current block is encoded in the multi-mode intra prediction, dividing the current block into a plurality of partial blocks; and obtaining an intra prediction mode of each of the plurality of partial blocks.

17 Claims, 22 Drawing Sheets

(30) Foreign Application Priority Data

Apr. 18, 2017 (KR) .......................... 10-2017-0050049
Apr. 18, 2017 (KR) .......................... 10-2017-0050054

(51) Int. Cl.
*H04N 19/107* (2014.01)
*H04N 19/136* (2014.01)
*H04N 19/176* (2014.01)
*H04N 19/463* (2014.01)
*H04N 19/70* (2014.01)

(52) U.S. Cl.
CPC ......... *H04N 19/136* (2014.11); *H04N 19/176* (2014.11); *H04N 19/463* (2014.11); *H04N 19/70* (2014.11)

(58) Field of Classification Search
USPC .................................................. 375/240.02
See application file for complete search history.

(56) References Cited

U.S. PATENT DOCUMENTS

| | | |
|---|---|---|
| 2010/0086030 A1 | 4/2010 | Chen et al. |
| 2011/0274166 A1 | 11/2011 | Jeon et al. |
| 2013/0089265 A1 | 4/2013 | Yie et al. |
| 2013/0108182 A1 | 5/2013 | Yie et al. |
| 2015/0163512 A1* | 6/2015 | Cai ...................... H04N 19/593 375/240.12 |

FOREIGN PATENT DOCUMENTS

| | | |
|---|---|---|
| KR | 10-2013-0054461 A | 5/2013 |
| KR | 10-2015-0038296 A | 4/2015 |
| KR | 10-2015-0113524 A | 10/2015 |

* cited by examiner

FIG. 22

| a3 | b3 | c3 | d3 | e3 | f3 | g3 | h3 |
|----|----|----|----|----|----|----|----|
| i3 | a2 | b2 | c2 | d2 | e2 | f2 | g2 |
| j3 | h2 | a1 | b1 | c1 | d1 | e1 | f1 |
| k3 | i2 | g1 | | | | | |
| l3 | j2 | h1 | PREDICTION BLOCK (4×4) | | | | |
| m3 | k2 | i1 | | | | | |
| n3 | l2 | j1 | | | | | |
| o3 | m2 | k1 | | | | | |

| CONDITION | | | MPM CANDIDATE 1 | MPM CANDIDATE 1 | MPM CANDIDATE 1 |
|---|---|---|---|---|---|
| L = A | L = ANGULAR PREDICTION MODE | | L | L-1 | L+1 |
| | OTHERS | | Planar | DC | VERTICAL |
| L ≠ A | L ≠ Planar MODE && A ≠ Planar MODE | | L | A | Planar |
| | OTHERS | L≠DC MODE && A≠DC MODE | L | A | DC |
| | | OTHERS | L | A | VERTICAL | ial Application No. PCT/KR2017/004576, filed
VIDEO SIGNAL ENCODING/DECODING METHOD AND APPARATUS

CROSS REFERENCE TO RELATED APPLICATION(S)

This application is a U.S. National Stage Application of International Application No. PCT/KR2017/004576, filed on Apr. 28, 2017, which claims the benefit under 35 USC 119(a) and 365(b) of Korean Patent Application No. 10-2016-0052925 filed on Apr. 29, 2016, Korean Patent Application No. 10-2016-0052692 filed Apr. 29, 2016, Korean Patent Application No. 10-2017-0050054, filed Apr. 18, 2017 and Korean Patent Application No. 10-2017-0050049, filed Apr. 18, 2017, in the Korean Intellectual Property Office.

TECHNICAL FIELD

The present invention relates to a method and an apparatus for encoding/decoding image signal.

BACKGROUND ART

Recently, demands for multimedia data such as video have been rapidly increasing on internet. However, developing rate of bandwidths of channels is hard to follow the amount of multimedia data that is rapidly increasing.

DISCLOSURE

Technical Problem

An object of the present invention is to improve compression efficiency of an image by using a multi-intra-prediction mode in encoding/decoding an image.

An object of the present invention is to improve compression efficiency of an image by efficiently encoding/decoding a multi-intra-prediction mode of a target encoding/decoding block in encoding/decoding an image.

An object of the present invention is to improve compression efficiency of an image by efficiently encoding/decoding coefficients in a partial block.

Technical Solution

A method and an apparatus for decoding an image according to the present invention may decode information indicating whether a current block is encoded using a multi-intra-prediction mode; partition the current block into a plurality of partial blocks when it is determined that the current block is encoded by the multi-intra-prediction mode; and obtain an intra-prediction mode of each of the plurality of partial blocks.

A method and an apparatus for decoding an image according to the present invention may, when partitioning the current block into the plurality of partial blocks, determine an inflection point among adjacent pixels adjacent to the current block; obtain slope information based on a plurality of pixels adjacent to the inflection point; and determine a partitioning shape of the current block based on the inflection point and the slope information.

In a method and an apparatus for decoding an image according to the present invention, the inflection point may be determined based on an inflection value of each of adjacent pixels, and the inflection value may be generated based on a differentials value between neighboring pixels neighboring the adjacent pixel.

In a method and an apparatus for decoding an image according to the present invention may, when obtaining the intra-prediction mode of each of the plurality of partial blocks, obtain a first intra-prediction mode of a first partial block; decode a differential value between the first intra-prediction mode and a second intra-prediction mode of a second partial block; and obtain the second intra-prediction mode based on the differential value.

In a method and an apparatus for decoding an image according to the present invention, the intra-prediction mode of each of the plurality of partial blocks may have a different value.

A method and an apparatus for encoding an image according to the present invention may determine whether a current block is encoded by a multi-intra-prediction mode; encode information indicating whether the current block uses a multi-intra-prediction mode, based on the determination result; when the current block is set to use a multi-intra-prediction mode, partition the current block into a plurality of partial blocks; and determine an intra-prediction mode of each of the plurality of partial blocks.

A method and an apparatus for encoding an image according to the present invention may, when partitioning the current block into the plurality of partial blocks, determine an inflection point among adjacent pixels adjacent to the current block; obtain slope information based on a plurality of pixels adjacent to the inflection point; and determine a partitioning shape of the current block based on the inflection point and the slope information.

In a method and an apparatus for encoding an image according to the present invention, the inflection point may be determined based on an inflection value of each of adjacent pixels, and the inflection value may be generated based on a differentials value between neighboring pixels neighboring the adjacent pixel.

A method and an apparatus for encoding an image according to the present invention may determine a first intra-prediction mode of a first partial block among the plurality of partial blocks; determine a second intra-prediction mode of a first partial block among the plurality of partial blocks; encode a differential value between the first intra-prediction mode and the second intra-prediction mode.

In a method and an apparatus for encoding an image according to the present invention, the intra-prediction mode of each of the plurality of partial blocks may have a different value.

Advantageous Effects

According to the present invention, compression efficiency of an image may be improved by using a multi-intra-prediction mode in encoding/decoding an image.

According to the present invention, compression efficiency of an image may be improved by efficiently encoding/decoding a multi-intra-prediction mode of a target encoding/decoding block in encoding/decoding an image.

According to the present invention, compression efficiency of an image may be improved by efficiently encoding/decoding coefficients in a partial block.

DESCRIPTION OF DRAWINGS

FIG. 22 is a diagram for explaining an example of calculating slope information of an adjacent pixel.

MODE FOR INVENTION

Figure 1:
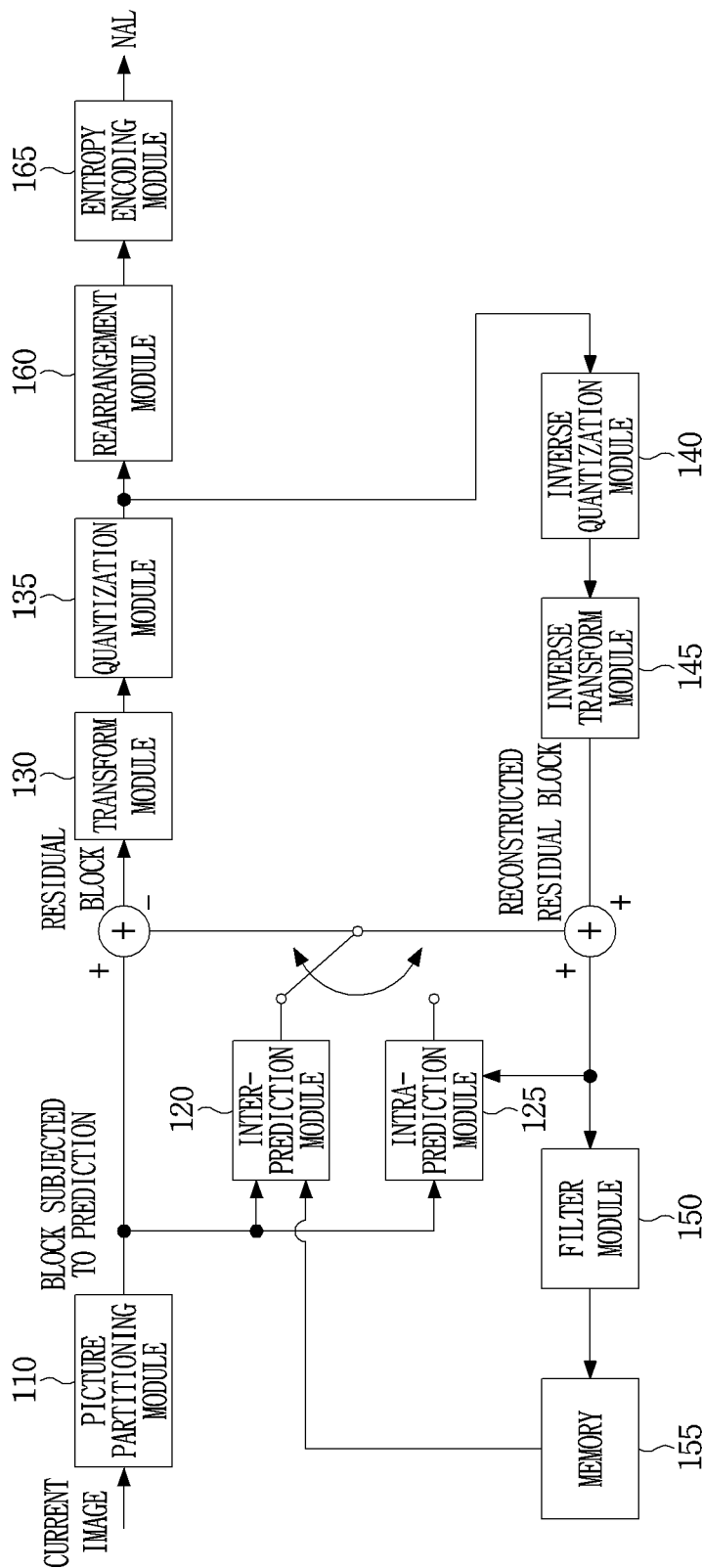
FIG. 1 is a block diagram illustrating a device for encoding image according to an embodiment of the present invention.

A variety of modifications may be made to the present invention and there are various embodiments of the present invention, examples of which will now be provided with reference to drawings and described in detail. However, the present invention is not limited thereto, and the exemplary embodiments can be construed as including all modifications, equivalents, or substitutes in a technical concept and a technical scope of the present invention. The similar reference numerals refer to the similar element in described the drawings.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added.

Hereinafter, preferred embodiments of the present invention will be described in detail with reference to the accompanying drawings. Hereinafter, the same constituent elements in the drawings are denoted by the same reference numerals, and a repeated description of the same elements will be omitted.

FIG. 1 is a block diagram illustrating a device for encoding image according to an embodiment of the present invention.

Referring to 1, an image encoding device 100 may include a picture partitioning module 110, prediction modules 120 and 125, a transform module 130, a quantization module 135, a rearrangement module 160, an entropy encoding module 165, an inverse quantization module 140, an inverse transform module 145, a filter module 150, and a memory 155.

The constitutional parts shown in FIG. 1 are independently shown so as to represent characteristic functions different from each other in the image encoding device, and it does not mean that each constitutional part is constituted in a constitutional unit of separated hardware or software. In other words, each constitutional part includes each of enumerated constitutional parts for convenience, and at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

Also, some of constituents may not be indispensable constituents performing essential functions of the present invention but be optional constituents improving only performance thereof. The present invention may be implemented by including only the indispensable constitutional parts for implementing the essence of the present invention except the constituents used in improving performance. The structure including only the indispensable constituents except the optional constituents used in improving only performance is also included in the scope of the present invention.

The picture partitioning module 110 may partition an input picture into at least one block. Here, a block may mean a coding unit (CU), a prediction unit (PU), or a transform unit (TU). The partitioning may be performed based on at least one of a quad tree or a binary tree. A quad tree is a method of partitioning an upper-level block into four lower-level blocks whose width and height are half of the upper-level block. A binary tree is a method of partitioning an upper-level block into two lower-level blocks whose width or height is half of the upper-level block. Using the binary tree-based partitioning, a block may have a square shape as well as a non-square shape.

Hereinafter, in embodiments of the present invention, a coding unit may be used as a unit for performing encoding, or may be used as a unit for performing decoding.

The prediction modules 120 and 125 may include an inter-prediction module 120 for performing inter-prediction and an intra-prediction module 125 for performing intra-prediction. Whether to perform inter-prediction or intra-prediction for a prediction unit may be determined, and specific information (e.g., intra-prediction mode, motion vector, reference picture, etc.) according to each prediction method may be determined. Here, a processing unit subjected to prediction may be different from a processing unit for which a prediction method and specific contents are determined. For example, a prediction method, a prediction mode and the like may be determined in units of prediction unit, and a prediction may be performed in units of transform unit.

The encoding device may determine an optimal prediction mode for an encoding block by using various schemes such as rate-distortion optimization (RDO) for a residual block obtained by subtracting a source block from a prediction block. In one example, RDO may be determined by the following Equation 1.

$$J(\Phi,\lambda)=D(\Phi)+\lambda R(\Phi) \qquad \text{[Equation 1]}$$

In the above Equation (1), D represents a deterioration due to quantization, R represents a rate of compressed stream, and J represents the RD cost. Further, $\Phi$ represents an encoding mode, $\lambda$ represents a Lagrangian multiplier. $\lambda$ may be used as a scale correction coefficient for matching a unit of error amount and bit amount. In an encoding procedure, an encoding device may determine a mode with a minimum RD cost value as an optimal mode for an encoding block. Here, an RD-cost value is calculated considering both a bit rate and an error.

Figure 3:
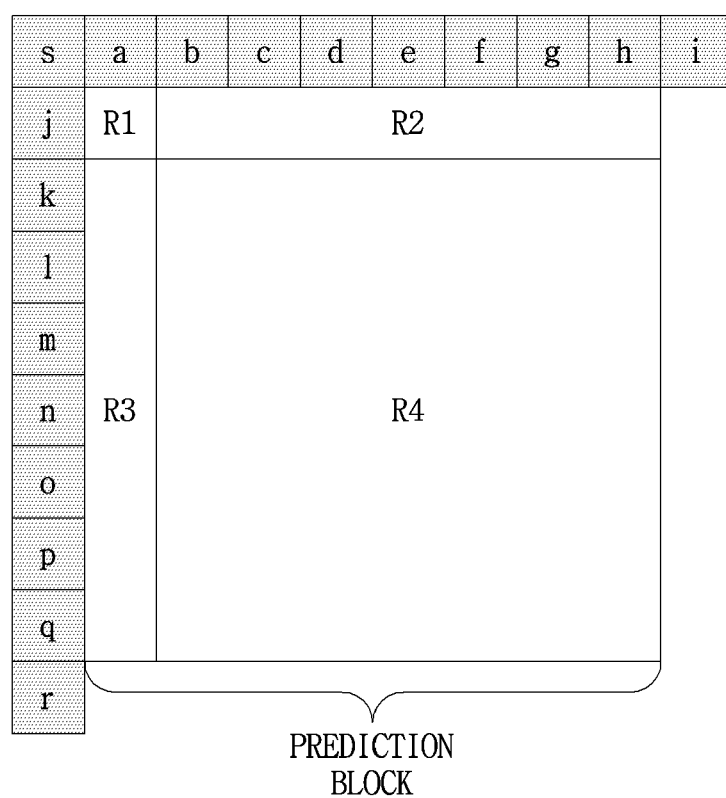
FIG. 3 is a diagram for explaining an intra-prediction method using a DC mode.

Among intra-prediction modes, a DC mode, which is a non-directional prediction mode (or a non-angular prediction mode), may use an average value of neighboring pixels of a current block. FIG. 3 is a diagram for explaining an intra-prediction method using a DC mode.

After an average value of neighboring pixels is filled in a prediction block, a filtering may be performed on pixels located at a boundary of the prediction block. In one example, weighted sum filtering with neighboring reference pixels may be applied to pixels located at a left or top boundary of a prediction block. For example, Equation 2 shows an example of generating prediction pixels through a DC mode for each region. In Equation 1, zones R1, R2, R3 are regions located at an outermost (i.e., boundary) of a prediction block, and weighted sum filtering may be applied to pixels included in the region.

$$\text{DC Value} = \frac{\sum_{x=0}^{Wid-1} R[x][-1] + \sum_{y=0}^{Hei-1} R[-1][y] + ((Wid+Hei) \gg 1)}{(Wid+Hei)} \qquad \text{[Equation 2]}$$

R1 region) $Pred[0][0] =$
$(R[-1][0] + 2*\text{DC value} + R[0][-1] + 2) \gg 2$

R2 region) $Pred[x][0] = (R[x][-1] + 3*\text{DC value} + 2) \gg 2,$
$x > 0$

R3 region) $Pred[0][y] = (R[0][y] + 3*\text{DC value} + 2) \gg 2,$
$y > 0$

R4 region) $Pred[x][y] = \text{DC value}, x > 0, y > 0$

In the Equation 2, Wid represents a horizontal length of a prediction block, and Hei represents a vertical length of a prediction block. x, y means a coordinate position of each prediction pixel when a most left top position of a prediction block is defined as (0, 0). R denotes a neighboring pixel. For example, when pixel s shown in FIG. 3 is defined as R [−1][−1], pixel a to pixel i may be represented as R [0] [−1] to R [8] [−1], pixel j to pixel r may be represented as R [−1] [0] to R [−1] [8]. In the example shown in FIG. 3, a prediction pixel value Pred may be calculated for each of regions R1 to R4 according to a weighted sum filtering method as shown in Equation 2.

A planar mode among a non-directional mode is a method of generating a prediction pixel of a current block by applying linear interpolation to neighboring pixels of the current block by distance. For example, FIG. 4 is a diagram for explaining an intra-prediction method using a planar mode.

Figure 4:
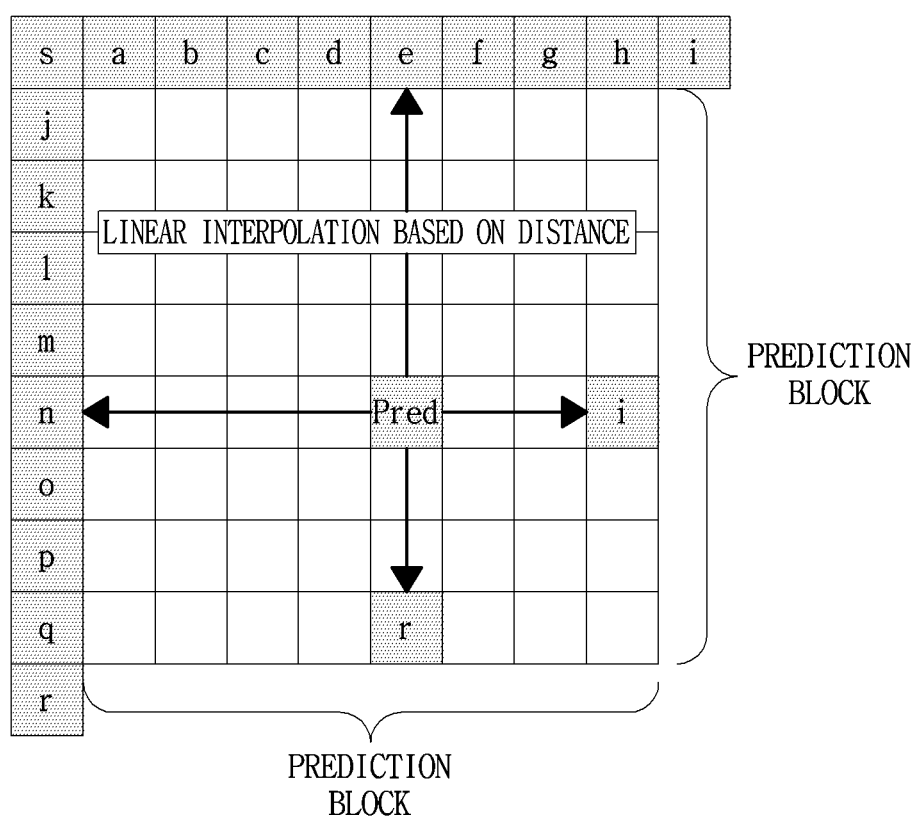
FIG. 4 is a diagram for explaining an intra-prediction method using a planar mode.

For example, it is assumed that Pred shown in FIG. 4 is predicted in an 8×8 encoding block. In this case, pixel e located at a top side of Pred and pixel r pixel located at a left bottom side of Pred may be copied to a most bottom side of Pred, and a vertical prediction value may be obtained by linear interpolation by distance in a vertical direction. In addition, pixel n located at a left side of Pred and pixel i located at a right top side of Pred may be copied to a most right side of Pred, and a horizontal prediction value may be obtained by linear interpolation by distance in a horizontal direction. Then, an average value of the horizontal and vertical prediction values may be determined as a value of Pred. Equation 3 is a formula expressing a process of obtaining a prediction value Pred according to a planner mode.

$$Pred[x][y] = \frac{[(Wid-1-x)*R[-1][y]] + [(x+1)*R[Wid][-1]] + [(Hei-1-y)*R[x][-1]] + [(y+1*R[-1][Hei]] + 1}{2}$$ [Equation 3]

In the Equation 3, Wid represents a horizontal length of a prediction block, and Hei represents a vertical length of a prediction block. x, y means a coordinate position of each prediction pixel when a most left top position of a prediction block is defined as (0, 0). R denotes a neighboring pixel. For example, when pixel s shown in FIG. 4 is defined as R [−1] [−1], pixel a to pixel i may be represented as R [0] [−1] to R [8] [−1], pixel j to pixel r may be represented as R [−1] [0] to R [−1] [8].

Figure 5:
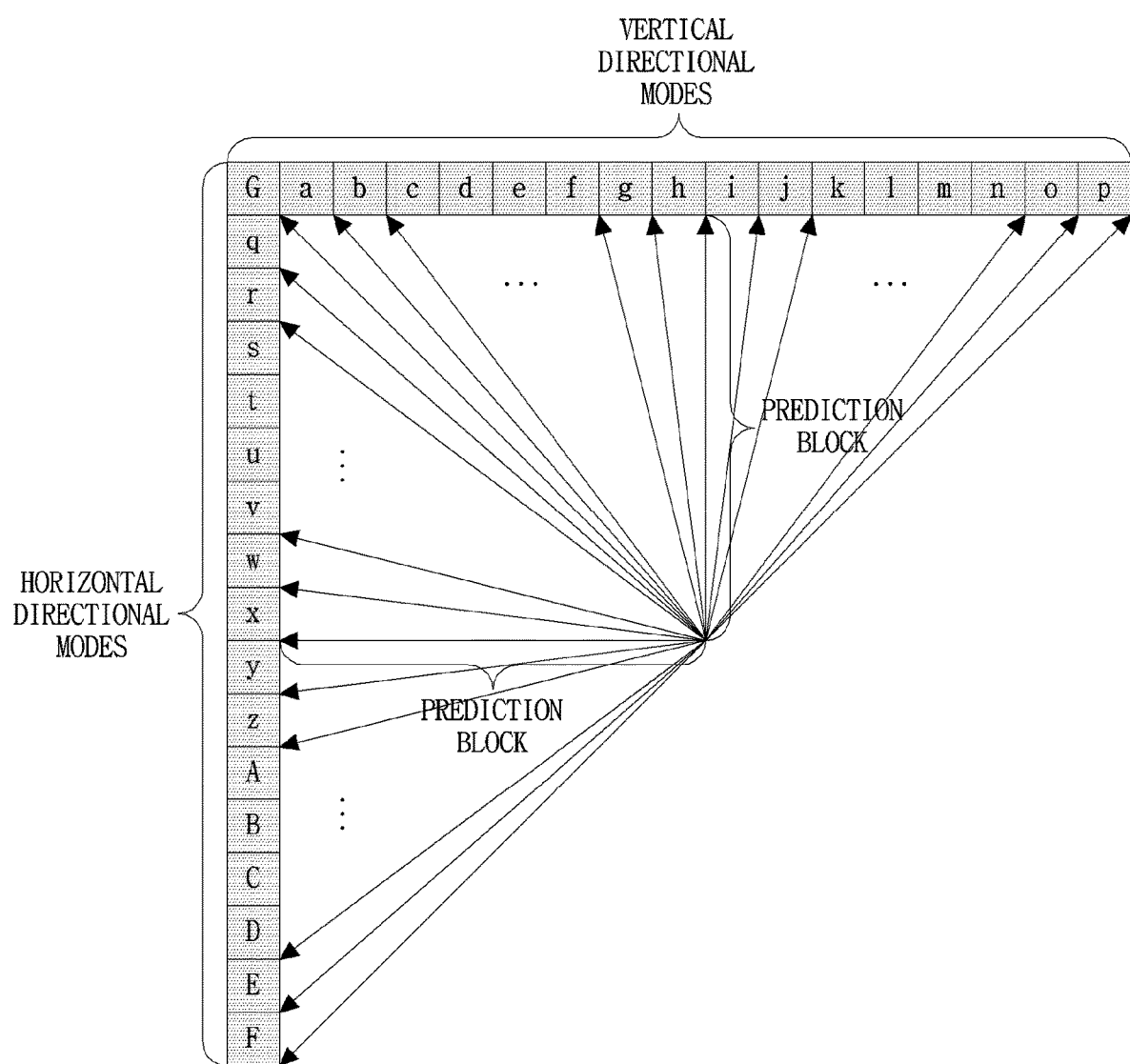
FIG. 5 is a diagram for explaining an intra-prediction method using a directional prediction mode.

FIG. 5 is a diagram for explaining an intra-prediction method using a directional prediction mode.

A directional prediction mode (or an angular prediction mode) is a method of generating at least one or more pixels located in any one of N predetermined directions among neighboring pixels of a current block as prediction samples.

A directional prediction mode may include a horizontal direction mode and a vertical direction mode. Here, a horizontal directional mode means modes having greater horizontal directionality than an angular prediction mode directed to 45 degrees to a left top side, and a vertical directional mode means modes having greater vertical direction than an angular prediction mode directed to 45 degrees to a left top side. A directional prediction mode having a prediction direction directed to 45 degrees to a left top side may be treated as a horizontal directional mode or may be treated as a vertical directional mode. In FIG. 5, horizontal directional modes and vertical directional modes are shown.

Referring to FIG. 5, there may be a direction that does not match to an integer pixel portion for each direction. In such a case, after applying an interpolation by distance such as a linear interpolation method, a DCT-IF method, a cubic convolution interpolation method, and the like to a distance between a pixel and a neighboring pixel, and the pixel values may be filled in a pixel position matching to a direction of a prediction block.

A residual value (residual block or transform block) between the generated prediction block and an original block may be input to the transform module 130. A residual block is a minimum unit for transform and quantization procedure. A partitioning method of an encoding block may be applied to a transform block. In one example, a transform block may be partitioned into four or two partial blocks.

Prediction mode information, motion vector information and the like used for prediction may be encoded with a residual value by the entropy encoding module 165 and may be transmitted to a decoding device. When a particular encoding mode is used, it is possible to transmit to a decoding device by encoding the original block as it is without generating the prediction block through the prediction modules 120 and 125.

The inter-prediction module 120 may predict the prediction unit based on information of at least one of a previous picture or a subsequent picture of the current picture, or may predict the prediction unit based on information of some encoded regions in the current picture, in some cases. The inter-prediction module 120 may include a reference picture interpolation module, a motion prediction module, and a motion compensation module.

The reference picture interpolation module may receive reference picture information from the memory 155 and may generate pixel information of an integer pixel or less than the integer pixel from the reference picture. In the case of luma pixels, an 8-tap DCT-based interpolation filter having different filter coefficients may be used to generate pixel information of an integer pixel or less than an integer pixel in units of a ¼ pixel. In the case of chroma signals, a 4-tap DCT-based interpolation filter having different filter coefficient may be used to generate pixel information of an integer pixel or less than an integer pixel in units of a ⅛ pixel.

The motion prediction module may perform motion prediction based on a reference picture interpolated by the reference picture interpolation module. As methods for calculating a motion vector, various methods, such as a full search-based block matching algorithm (FBMA), a three step search (TSS), a new three-step search algorithm (NTS), etc., may be used. The motion vector may have a motion vector value in units of a ½ pixel or a ¼ pixel based on an interpolated pixel. The motion prediction module may predict a current prediction unit by changing the motion prediction method. As motion prediction methods, various methods, such as a skip method, a merge method, an Advanced Motion Vector Prediction (AMVP) method, etc., may be used.

An encoding device may generate motion information of a current block based on motion estimation or motion information of a neighboring block. Here, the motion information may include at least one of a motion vector, a reference image index and a prediction direction.

The intra prediction module 125 may generate a prediction unit based on reference pixel information neighboring to a current block which is pixel information in the current picture. When the neighboring block of the current prediction unit is a block subjected to inter-prediction and thus a reference pixel is a pixel subjected to inter-prediction, the reference pixel included in the block subjected to inter-prediction may be replaced with reference pixel information of a neighboring block subjected to intra-prediction. That is, when a reference pixel is not available, at least one reference pixel of available reference pixels may be used instead of unavailable reference pixel information.

Prediction modes in intra-prediction may include a directional prediction mode using reference pixel information depending on a prediction direction and a non-directional prediction mode not using directional information in performing prediction. A mode for predicting luma information may be different from a mode for predicting chroma information, and in order to predict the chroma information, intra-prediction mode information used to predict luma information or predicted luma signal information may be utilized.

In the intra-prediction method, a prediction block may be generated after applying an Adaptive Intra Smoothing (AIS) filter to a reference pixel depending on the prediction modes.

The type of the AIS filter applied to the reference pixel may vary. In order to perform the intra prediction method, an intra prediction mode of the current prediction unit may be predicted from the intra prediction mode of the prediction unit neighboring to the current prediction unit. In prediction of the prediction mode of the current prediction unit by using mode information predicted from the neighboring prediction unit, when the intra prediction mode of the current prediction unit is the same as the intra prediction mode of the neighboring prediction unit, information indicating that the prediction modes of the current prediction unit and the neighboring prediction unit are equal to each other may be transmitted using predetermined flag information, and when the prediction mode of the current prediction unit is different from the prediction mode of the neighboring prediction unit, entropy encoding may be performed to encode prediction mode information of the current block.

Also, a residual block including information on a residual value which is a difference between the prediction unit subjected to prediction and the original block of the prediction unit may be generated based on prediction units generated by the prediction modules 120 and 125. The generated residual block may be input to the transform module 130.

The transform module 130 may transform the residual block including residual data using a transform method, such as discrete cosine transform (DCT), discrete sine transform (DST), and Karhunen Loeve Transform (KLT). In order to make easy use of a transform method, a matrix operation is performed using a basis vector. Here, depending on a prediction mode in which a prediction block is encoded, various transform methods may be variously mixed and used in matrix operation. For example, when performing intra-prediction, depending on intra-prediction mode, discrete cosine transform may be used for horizontal direction and discrete sine transform may be used for vertical direction.

The quantization module 135 may quantize values transformed to a frequency domain by the transform module 130. That is, the quantization module 135 may quantize transform coefficients of a transform block generated from the transform module 130, and generate a quantized transform block having the quantized transform coefficients. Here, the quantization methods may include Dead Zone Uniform Threshold Quantization (DZUTQ) or a Quantization Weighted Matrix, and the like. It is also possible to use improved quantization methods that improve these quantization methods. The quantization coefficients may vary depending on a block or an importance of an image. Values calculated by the quantization module 135 may be provided to the inverse quantization module 140 and the rearrangement module 160.

The transform module unit 130 and/or the quantization module 135 may be selectively included in the image encoding device 100. That is, the image encoding device 100 may perform at least one of transformation or quantization on the residual data of the residual block, or may skip both the transformation and the quantization, thereby encoding the residual block. A block provided as an input of the entropy encoding module 165 is generally referred to as a transform block (or quantized transform block) even though either the transformation or the quantization is not performed or both the transformation and the quantization are not performed in the image encoding device 100.

The rearrangement module 160 may rearrange coefficients of quantized residual values.

The rearrangement module 160 may change a coefficient in the form of a two-dimensional block into a coefficient in the form of a one-dimensional vector through a coefficient scanning method. For example, the rearrangement module 160 may scan from a DC coefficient to a coefficient in a high frequency domain using a predetermined scanning method so as to change the coefficients to be in the form of one-dimensional vectors.

The entropy encoding module 165 may perform entropy encoding based on the values calculated by the rearrangement module 160. Entropy encoding may use various encoding methods, for example, exponential Golomb coding, context-adaptive variable length coding (CAVLC), and context-adaptive binary arithmetic coding (CABAL).

The entropy encoding module 165 may encode various information, such as residual value coefficient information and block type information of the coding unit, prediction mode information, partition unit information, prediction unit information and transmit unit information, motion vector information, reference frame information, interpolation information of a block, filtering information, etc. from the rearrangement module 160 and the prediction modules 120 and 125. In the entropy encoding module 165, the coefficient of the transform block may be encoded, in units of partial block in a transform block, as a non-zero coefficient, a coefficient whose absolute value is larger than 1 or 2, and various types of flags indicating a sign of a coefficient, etc. The coefficient that is not encoded with only the flag may be encoded through the absolute value of the difference between the coefficient encoded through the flag and the coefficient of the actual transform block. A method of encoding coefficients of the transform block will be described in detail with reference to FIG. 6.

The entropy encoding module 165 may entropy encode coefficients of the coding unit input from the rearrangement module 160.

The inverse quantization module 140 may inversely quantize the values quantized by the quantization module 135 and the inverse transform module 145 may inversely transform the values transformed by the transform module 130.

In addition, the inverse quantization module 140 and the inverse transform module 145 may perform inverse quantization and inverse transformation by inversely using the quantization method and the transformation method used in the quantization module 135 and the transform module 130. In addition, when the transform module 130 and the quantization module 135 perform only quantization and do not perform the transformation, only the inverse quantization is performed and the inverse transformation may not be performed. When both the transformation and the quantization are not performed, the inverse quantization module 140 and the inverse transform module 145 may neither perform inverse transform nor inverse quantization nor be included in the image encoding device 100 and may be omitted.

The residual value generated by the inverse quantization module 140 and the inverse transform module 145 may be combined with the prediction unit predicted by a motion estimation module, a motion compensation module, and the intra-prediction module included in the prediction modules 120 and 125 so as to generate a reconstructed block.

The filter module 150 may include at least one of a deblocking filter, an offset correction unit, and an adaptive loop filter (ALF).

The deblocking filter may remove block distortion that occurs due to boundaries between the blocks in the reconstructed picture. In order to determine whether to perform deblocking, the pixels included in several rows or columns included in the block may be a basis of determining whether to apply the deblocking filter to the current block. When the deblocking filter is applied to the block, a strong filter or a weak filter may be applied depending on required deblocking filtering strength. Also, in applying the deblocking filter, horizontal direction filtering and vertical direction filtering may be processed in parallel.

The offset correction module may correct offset with the original picture in units of a pixel in the picture subjected to deblocking. In order to perform the offset correction on a particular picture, it is possible to use a method of applying offset in consideration of edge information of each pixel or a method of partitioning pixels of a picture into the predetermined number of regions, determining a region to be subjected to perform offset, and applying the offset to the determined region.

Adaptive loop filtering (ALF) may be performed based on the value obtained by comparing the filtered reconstructed picture and the original picture. The pixels included in the picture may be divided into predetermined groups, a filter to be applied to each of the groups may be determined, and filtering may be individually performed for each group. Information on whether to apply ALF and a luma signal may be transmitted by coding units (CU), and the shape and filter coefficient of a filter for ALF may vary depending on each block. Also, the filter for ALF in the same shape (fixed shape) may be applied regardless of characteristics of the application target block.

The memory 155 may store the reconstructed block or picture calculated through the filter module 150, and the stored reconstructed block or picture may be provided to the prediction modules 120 and 125 in performing inter-prediction.

Figure 2:
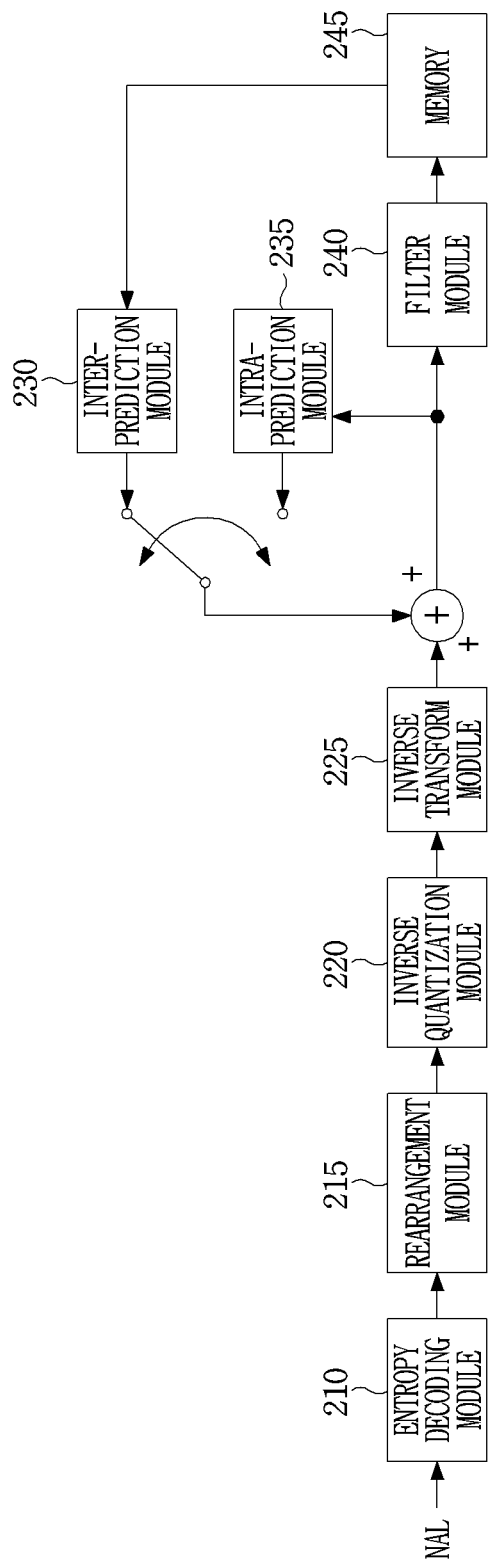
FIG. 2 is a block diagram illustrating a device for decoding an image according to an embodiment of the present invention.

FIG. 2 is a block diagram illustrating a device for decoding an image according to an embodiment of the present invention.

Referring to FIG. 2, the image decoding device 200 may include an entropy decoding module 210, a rearrangement module 215, an inverse quantization module 220, an inverse transform module 225, prediction modules 230 and 235, a filter module 240, and a memory 245.

When an image bitstream is input from the image encoding device, the input bitstream may be decoded according to an inverse process of the image encoding device.

The entropy decoding module 210 may perform entropy decoding according to an inverse process of entropy encoding by the entropy encoding module of the image encoding device. For example, corresponding to the methods performed by the image encoding device, various methods, such as exponential Golomb coding, context-adaptive variable length coding (CAVLC), and context-adaptive binary arithmetic coding (CABAC) may be applied. In the entropy decoding module 210, the coefficient of the transform block may be decoded, in units of partial block in a transform block, based on a non-zero coefficient, a coefficient whose absolute value is larger than 1 or 2, and various types of flags indicating a sign of a coefficient, etc. The coefficient that is not represented by only the flag may be decoded through combination of coefficient represented by the flag and coefficient that is signaled. A method of decoding the coefficients of the transform block will be described in detail with reference to FIG. 9.

The entropy decoding module 210 may decode information on intra-prediction and inter-prediction performed by the image encoding device.

The rearrangement module 215 may perform rearrangement on the bitstream entropy decoded by the entropy decoding module 210 based on the rearrangement method used in the image encoding device. The rearrangement may include reconstructing and rearranging the coefficients in the form of one-dimensional vectors to the coefficient in the form of two-dimensional blocks. The rearrangement module 215 may receive information related to coefficient scanning performed in the image encoding device and may perform rearrangement via a method of inversely scanning the coefficients based on the scanning order performed in the image encoding device.

The inverse quantization module 220 may perform inverse quantization based on a quantization parameter received from the image encoding device and the rearranged coefficients of the block.

The inverse transform module 225 may perform the inverse transform of the inverse quantized transform coefficients according to a predetermined transform method. Here, the transform method may be determined based on a prediction method (inter/intra-prediction), a size/shape of a block, information on intra-prediction mode, etc.

The prediction modules 230 and 235 may generate a prediction block based on information on prediction block generation received from the entropy decoding module 210 and previously decoded block or picture information received from the memory 245.

The prediction modules 230 and 235 may include a prediction unit determination module, an inter-prediction module, and an intra-prediction module. The prediction unit determination module may receive various information, such as prediction unit information, prediction mode information of an intra-prediction method, information on motion prediction of an inter-prediction method, etc. from the entropy decoding module 210, may divide a current coding unit into prediction units, and may determine whether inter-prediction or intra-prediction is performed on the prediction unit. By using information required in inter-prediction of the current prediction unit received from the image encoding device, the inter-prediction module 230 may perform inter-prediction on the current prediction unit based on information of at least one of a previous picture or a subsequent picture of the current picture including the current prediction unit. Alternatively, inter-prediction may be performed based on information of some pre-reconstructed regions in the current picture including the current prediction unit.

In order to perform inter-prediction, it may be determined for the coding unit which of a skip mode, a merge mode, an AMVP mode, and an inter block copy mode is used as the motion prediction method of the prediction unit included in the coding unit.

The intra-prediction module 235 may generate a prediction block based on pixel information in the current picture. When the prediction unit is a prediction unit subjected to intra-prediction, intra-prediction may be performed based on intra-prediction mode information of the prediction unit received from the image encoding device. The intra-prediction module 235 may include an adaptive intra smoothing (AIS) filter, a reference pixel interpolation module, a DC filter. The AIS filter performs filtering on the reference pixel of the current block, and whether to apply the filter may be determined depending on the prediction mode of the current prediction unit. AIS filtering may be performed on the reference pixel of the current block by using the prediction mode of the prediction unit and AIS filter information received from the image encoding device. When the prediction mode of the current block is a mode where AIS filtering is not performed, the AIS filter may not be applied.

When the prediction mode of the prediction unit is a prediction mode in which intra-prediction is performed based on the pixel value obtained by interpolating the reference pixel, the reference pixel interpolation module may interpolate the reference pixel to generate the reference pixel of an integer pixel or less than an integer pixel. When the prediction mode of the current prediction unit is a prediction mode in which a prediction block is generated without interpolation the reference pixel, the reference pixel may not be interpolated. The DC filter may generate a prediction block through filtering when the prediction mode of the current block is a DC mode.

The reconstructed block or picture may be provided to the filter module 240. The filter module 240 may include the deblocking filter, the offset correction module, the ALF.

Information on whether or not the deblocking filter is applied to the corresponding block or picture and information on which of a strong filter and a weak filter is applied when the deblocking filter is applied may be received from the image encoding device. The deblocking filter of the image decoding device may receive information on the deblocking filter from the image encoding device, and may perform deblocking filtering on the corresponding block.

The offset correction module may perform offset correction on the reconstructed picture based on the type of offset correction and offset value information applied to a picture in performing encoding.

The ALF may be applied to the coding unit based on information on whether to apply the ALF, ALF coefficient information, etc. received from the image encoding device. The ALF information may be provided as being included in a particular parameter set.

The memory 245 may store the reconstructed picture or block for use as a reference picture or block, and may provide the reconstructed picture to an output module.

Figure 6:
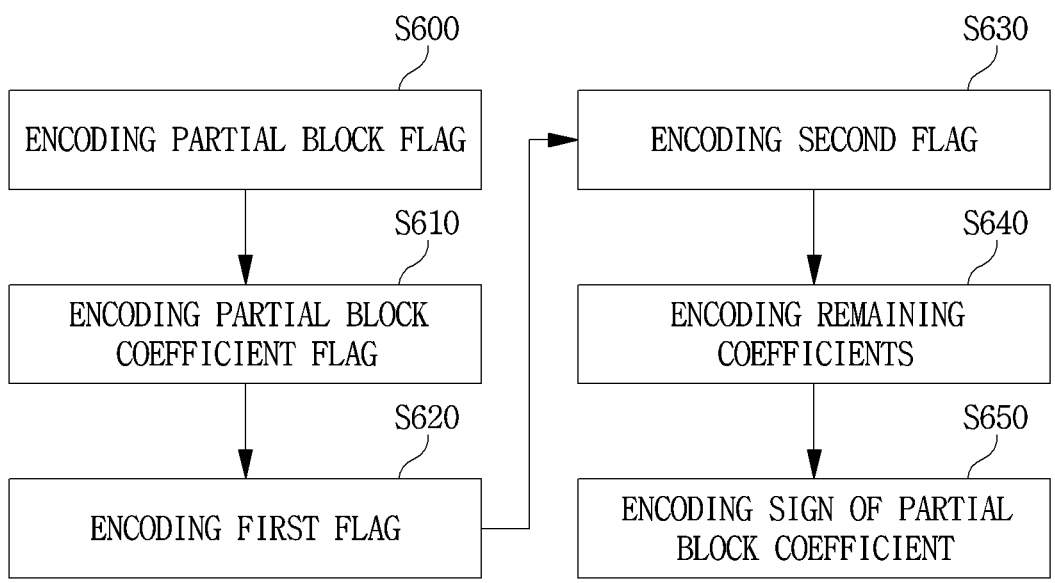
FIG. 6 is a diagram illustrating a method for encoding coefficients of a transform block as an embodiment to which the present invention is applied.

FIG. 6 is a diagram illustrating a method for encoding coefficients of a transform block as an embodiment to which the present invention is applied.

A coefficient of a transform block may be encoded in units of a predetermined block (hereinafter, referred to as a partial block) in an image encoding device. A transform block may include one or more partial blocks. A partial block may be a block of N×M size. Here, N and M are natural numbers, and N and M may be equal to or different from each other. That is, a partial block may be a square or a non-square block. A size/shape of a partial block may be fixed (e.g., 4×4) predefined in an image encoding device, or may be variably determined depending on a size/shape of a transform block. Alternatively, an image encoding device may determine an optimal size/shape of a partial block in consideration of an encoding efficiency, and encode the partial block. Information on a size/shape of an encoded partial block may be signaled in a level of at least one of a sequence, a picture, a slice or a block.

An order of encoding partial blocks included in a transform block may be determined according to a predetermined scan type (hereinafter, referred to as a first scan type) in an image encoding device. In addition, an order of encoding coefficients included in a partial block may be determined according to a predetermined scan type (hereinafter, referred to as a second scan type). The first scan type and the second scan type may be the same or different. For the first/second scan type, a diagonal scan, a vertical scan, or a horizontal scan and the like may be used. However, the present invention is not limited thereto, and one or more scan types having predetermined angles may be further added. The first/second scan type may be determined based on at least one of coding block related information (e.g., maximum/minimum size, partitioning technique, etc.), size/shape of transform block, size/shape of partial block, prediction mode, intra-prediction related information (e.g., a value of intra-prediction mode, directionality, angle, etc.) or inter-prediction related information.

An image encoding device may encode, in a transform block, position information of a coefficient (hereinafter, referred to as a non-zero coefficient) having non-zero value first appeared in the above-described encoding order. Encoding may be performed sequentially from a partial block including the non-zero coefficient. Hereinafter, referring to FIG. 6, a procedure of encoding coefficients of a partial block will be described.

A partial block flag for a current partial block may be encoded (S600). The partial block flag may be encoded in units of a partial block. The partial block flag may indicate whether there is at least one non-zero coefficient in the current partial block. For example, when the partial block flag is a first value, it may indicate that the current partial block includes at least one non-zero coefficient, and when the partial block flag is a second value, it may indicate that all coefficients of the current partial block are 0.

A partial block coefficient flag for a current partial block may be encoded (S610). The partial block coefficient flag may be encoded in units of a coefficient. The partial block coefficient flag may indicate whether a coefficient is a non-zero coefficient. For example, when the coefficient is a non-zero coefficient, the partial block coefficient flag may be encoded to a first value, and when the coefficient is zero, the partial block coefficient flag may be encoded to a second value. The partial block coefficient flag may be selectively encoded according to the partial block flag. For example, a current partial block may be encoded for each coefficient of a partial block only when there is at least one non-zero coefficient present in the current partial block (i.e., the partial block flag is a first value).

A flag (hereinafter, referred to as a first flag) indicating whether an absolute value of a coefficient is greater than 1 may be encoded (S620). The first flag may be selectively encoded according to a value of the partial block coefficient flag. For example, when the coefficient is a non-zero coefficient (i.e., the partial block coefficient flag is a first value), the first flag may be encoded by checking whether an absolute value of the coefficient is greater than 1. When the absolute value of the coefficient is greater than 1, the first flag is encoded to a first value, and when the absolute value of the coefficient is not greater than 1, the first flag may be encoded to a second value.

A flag (hereinafter, referred to as a second flag) indicating whether an absolute value of a coefficient is greater than 2 may be encoded (S630). The second flag may be selectively encoded according to a value of the first flag. For example, when the coefficient is greater than 1 (i.e., the first flag is a first value), the second flag may be encoded by checking whether an absolute value of the coefficient is greater than 2. When the absolute value of the coefficient is greater than 2, the second flag is encoded to a first value, and when the absolute value of the coefficient is not greater than 2, the second flag may be encoded to a second value.

The number of at least one of the first flag or the second flag may be at least one to at most N*M. Alternatively, at least one of the first flag or the second flag may be a fixed number (e.g., one, two, or more) predefined in an image encoding device. The number of the first/second flag may be different depending on a bit depth of an input image, a dynamic range of an original pixel value in a certain region of an image, a block size/depth, a partitioning technique (e.g., quad tree, binary tree), a transforming technique (e.g., DCT, DST), whether to skip transform, quantization parameters, prediction mode (e.g., intra/inter mode), and so on. In addition to the first/second flag, an n-th flag indicating whether an absolute value of a coefficient is greater than n may be additionally encoded. Here, n may mean a natural number greater than two. The number of the n-th flag may be one, two, or more, and may be determined in the same/similar manner as the first/second flag described above.

Remaining coefficients that are not encoded based on the first/second flag may be encoded in a current partial block (S640). Here, the encoding may be a procedure of encoding the coefficient value itself. The remaining coefficients may be equal to or greater than two. The remaining coefficient may be encoded based on at least one of a partial block coefficient flag, a first flag or a second flag for the remaining coefficient. For example, the remaining coefficient may be encoded to a value obtained by subtracting (partial block coefficient flag+first flag+second flag) from an absolute value of the remaining coefficient.

A sign for a coefficient of a partial block may be encoded (S650). The sign may be encoded in a flag format in units of a coefficient. The sign may be selectively encoded according to a value of the partial block coefficient flag described above. For example, the sign may be encoded only when the coefficient is a non-zero coefficient (i.e., the partial block coefficient flag is a first value).

As described above, each of absolute values of coefficients of the partial block may be encoded through at least one of encoding a partial block coefficient flag, encoding a first flag, encoding a second flag, or encoding a remaining coefficient.

In addition, above-described encoding coefficients of a partial block may further include a procedure of specifying a range of coefficient values belonging to the partial block. Through the above procedure, it may be confirmed whether or not at least one non-zero coefficient exists in a partial block. The above procedure may be implemented through at least one of (A) encoding a maximum value, (B) encoding a first threshold value flag or (C) encoding a second threshold value flag which will be described below. The above procedure may be implemented by being included in any one of the above-described steps S600 to S650, or may be implemented in a form that is substituted for at least one of steps S600 to S650. Hereinafter, the procedure of specifying a range of coefficient values belonging to a partial block will be described in detail with reference to FIG. 7 to FIG. 8.

Figure 7:
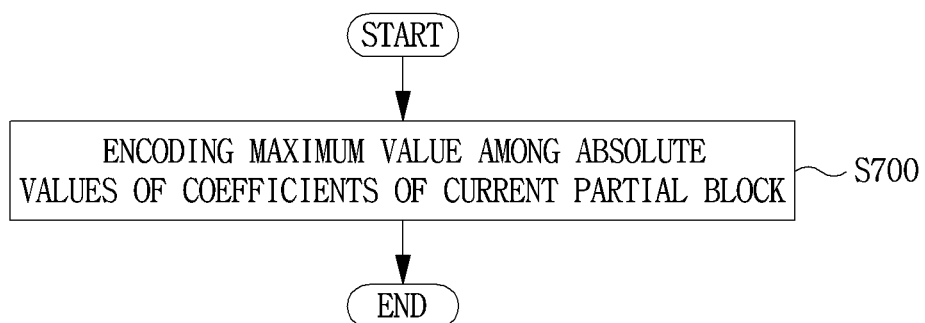
FIG. 7 is a diagram illustrating a method of encoding a maximum value of a coefficient of a partial block as an embodiment to which the present invention is applied.

FIG. 7 is a diagram illustrating a method of encoding a maximum value of a coefficient of a partial block as an embodiment to which the present invention is applied.

Referring to FIG. 7, a maximum value among absolute values of coefficients of a current partial block may be encoded (S700). Through the maximum value, a range of coefficient values belonging to the current partial block may be inferred. For example, when the maximum value is m, coefficients of the current partial block may fall within the range of 0 to m. The maximum value may be selectively encoded according to a value of the partial block flag described above. For example, the maximum value may be encoded only when a current partial block includes at least one non-zero coefficient (i.e., the partial block flag is a first value). When coefficients of the current partial block are all 0 (i.e., the partial block flag is a second value), the maximum value may be derived as 0.

In addition, through the maximum value, it may be determined whether or not at least one non-zero coefficient is included in a current partial block. For example, when the maximum value is greater than 0, the current partial block includes at least one non-zero coefficient, and when the maximum value is 0, all coefficients of the current partial block may be 0. Therefore, encoding the maximum value may be performed in place of the encoding of the partial block flag of S600.

Figure 8:
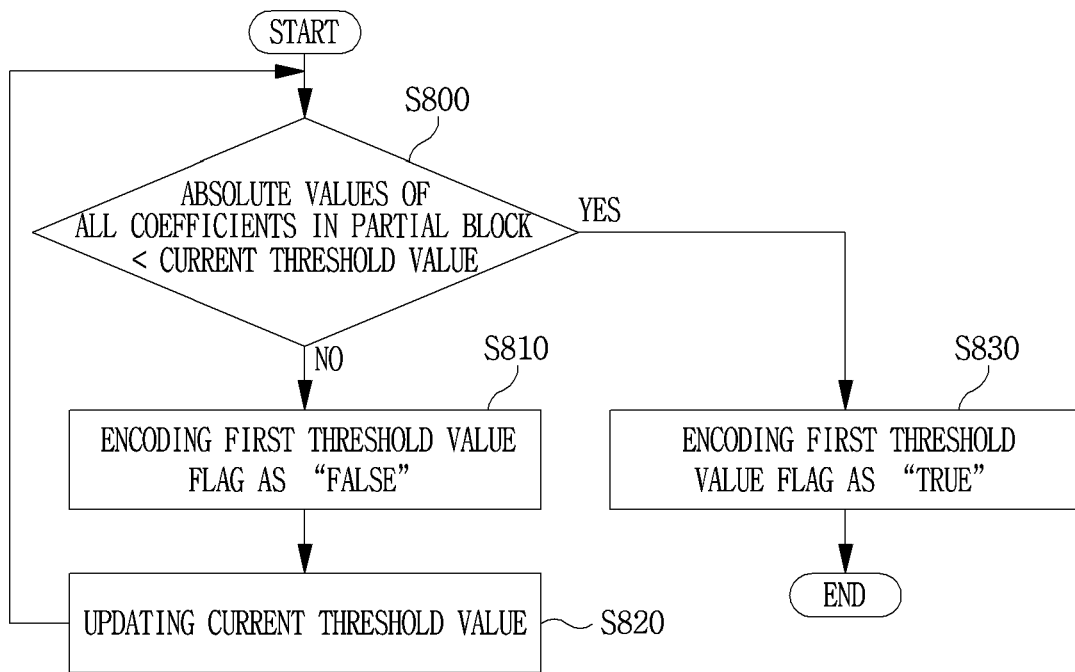
FIG. 8 is a diagram illustrating a method of encoding a first threshold value flag for a partial block as an embodiment to which the present invention is applied.

FIG. 8 is a diagram illustrating a method of encoding a first threshold value flag for a partial block as an embodiment to which the present invention is applied.

A first threshold value flag of the present invention may indicate whether or not all coefficients of a partial block are smaller than a predetermined threshold value. The number of threshold values may be N (N>=1), where a range of threshold values may be represented by $\{T_0, T_1, T_2, \ldots, T_{N-1}\}$. Here, the 0th threshold value $T_0$ denotes a minimum value, and the (N-1)-th threshold value $T_{N-1}$ denotes a maximum value, and $\{T_0, T_1, T_2, \ldots, T_{N-1}\}$ may be those in which the threshold values are arranged in ascending order. The number of the threshold values may be predetermined in an image encoding device. The image encoding device may determine an optimal number of threshold values in consideration of encoding efficiency and encode the number.

The threshold value may be obtained by setting the minimum value to 1 and increasing the minimum value by n (n>=1). The threshold value may be predetermined in an image encoding device. The image encoding device may determine an optimal threshold value in consideration of the encoding efficiency and encode the threshold value.

The range of the threshold value may be determined differently depending on a quantization parameter (QP). The QP may be set at a level of at least one of a sequence, a picture, a slice, or a transform block.

For example, when the QP is greater than a predetermined QP threshold, it may be expected that the distribution of zero coefficients in a transform block will be higher. In this case, the range of the threshold value may be determined as {3}, or the encoding procedure of the first/second threshold value flag may be omitted, and coefficients of a partial block may be encoded through steps S600 to S650 described above.

When the QP is smaller than a predetermined QP threshold, it may be expected that the distribution of non-zero coefficients in a transform block will be higher. In this case, the range of the threshold value may be determined as {3, 5} or {5, 3}.

That is, the range of threshold values when QP is small may have the number and/or size (e.g., maximum value) of the threshold values different from the threshold value range when QP is large. The number of QP threshold values may be one, two, or more. The QP threshold value may be predetermined in an image encoding device. For example, the QP threshold value may correspond to a median value of a range of QPs available in the image encoding device. Alternatively, the image encoding device may determine an optimal QP threshold value considering encoding efficiency, and encode the QP threshold value.

Alternatively, a range of threshold values may be determined differently depending on the size/shape of a block. Here, a block may mean a coding block, a prediction block, a transform block, or a partial block. The size may be represented by at least one of a width, a height, a sum of a width and a height, or the number of coefficient.

For example, when a size of a block is smaller than a predetermined threshold size, a range of threshold values may be determined as {3}, or the encoding procedure of the first/second threshold value flag may be omitted, and coefficients of a partial block may be encoded through steps S600 to S650 described above. When a size of a block is larger than a predetermined threshold size, a range of threshold values may be determined as {3, 5} or {5, 3}.

That is, the range of threshold values when a block size is small may have the number and/or size (e.g., maximum value) of the threshold values different from the threshold value range when a block size is large. The number of threshold size may be one, two, or more. The threshold size may be predetermined in an image encoding device. For example, the threshold size may be represented by a×b, wherein a and b are 2, 4, 8, 16, 32, 64 or more, and a and b may be equal to or different from each other. Alternatively, the image encoding device may determine an optimal threshold size considering encoding efficiency, and encode the threshold size.

Alternatively, the range of threshold values may be determined differently depending on a range of pixel values. The range of pixel values may be represented by a maximum value and/or a minimum value of pixels belonging to a predetermined region. Here, the predetermined region may mean at least one of a sequence, a picture, a slice, or a block.

For example, when the difference between the maximum value and the minimum value of the range of pixel values is smaller than a predetermined threshold difference value, the range of threshold values is determined as {3}, or the encoding procedure of the first/second threshold value flag may be omitted, and coefficients of a partial block may be encoded through steps S600 to S650 described above. When the difference is larger than a predetermined threshold difference value, the range of threshold values may be determined as {3, 5} or {5, 3}.

That is, the range of threshold values when the difference is small may have the number and/or size (e.g., maximum value) of the threshold values different from a range of threshold values when the difference is large. The number of threshold difference values may be one, two, or more. The threshold difference value may be predetermined in an image encoding device. Alternatively, the image encoding device may determine an optimal threshold difference value considering encoding efficiency, and encode the threshold difference value.

Referring to FIG. 8, it may be determined whether absolute values of all coefficients in a current partial block is smaller than a current threshold value (S800).

When the absolute values of all coefficients are not smaller than the current threshold value, a first threshold value flag may be encoded as "false" (S810). In this case, the current threshold value (i-th threshold value) may be updated to the next threshold value ((i+1)-th threshold value) (S820), and the above described step S800 may be performed based on the updated current threshold value. Alternatively, when absolute values of all coefficients are not smaller than the current threshold value, the first threshold value flag encoding procedure of step S810 may be omitted, and the current threshold value may be updated to the next threshold value.

When the current threshold value reaches a maximum value of a threshold value or when the number of the threshold values is 1, the current threshold value may be updated by adding a predetermined constant to the current threshold value. The predetermined constant may be an integer greater than or equal to one. Here, the update may be repeatedly performed until the first threshold value flag is encoded as "true". Based on the updated current threshold value, step S800 may be performed. Alternatively, when the current threshold value reaches the maximum value of the threshold value or when the number of threshold values is 1, the updating procedure may be terminated.

When absolute values of all coefficients are smaller than a current threshold value, the first threshold value flag may be encoded as "true" (S830).

As described above, when the first threshold value flag for the i-th threshold value is "true", this may indicate that absolute values of all coefficients in a partial block are smaller than the i-th threshold value. When the first threshold value flag for the i-th threshold is "false", this may indicate that absolute values of all coefficients in the partial block is greater than or equal to the i-th threshold. Based on the first threshold flag that is "true", a range of coefficient values belonging to the partial block may be specified. That is, when the first threshold value flag for the i-th threshold value is "true", the coefficient belonging to the partial block may fall within the range of 0 to (i-th threshold value−1).

According to the encoded first threshold value flag, at least one of steps S600 to S650 described above may be omitted.

For example, when a range of threshold values is {3, 5}, at least one of the first threshold value flag for the threshold value "3" or the first threshold value flag for the threshold value "5" may be encoded. When the first threshold value flag for the threshold value "3" is "true", absolute values of all coefficients in the partial block may fall within the range of 0 to 2. In this case, coefficients of the partial block may be encoded by performing the remaining steps except at least one of the above-described steps S630 or S640, or the coefficients of the partial block may be encoded by performing the remaining steps except at least one of S600, S630 or S640.

When the first threshold value flag for the threshold "3" is "false", the first threshold value flag for the threshold "5" may be encoded. When the first threshold value flag for the threshold "5" is "false", at least one of absolute values of coefficients in a partial block may be greater than or equal to 5. In this case, coefficients of the partial block may be encoded by performing the above-described steps S600 to S650 in the same manner, or coefficients of the partial block may be encoded by performing the remaining steps except step S600.

When the first threshold value flag for the threshold "5" is "true", absolute values of all coefficients in the partial block may fall within the range of 0 to 4. In this case, coefficients of the partial block may be encoded by performing the above-described steps S600 to S650 in the same manner, or coefficients of the partial block may be encoded by performing the remaining steps except step S600.

In addition, a first threshold value flag of a current partial block may be derived based on a first threshold flag of another partial block. In this case, the encoding procedure of the first threshold value flag may be omitted, and this will be described with reference to FIG. 14.

Figure 9:
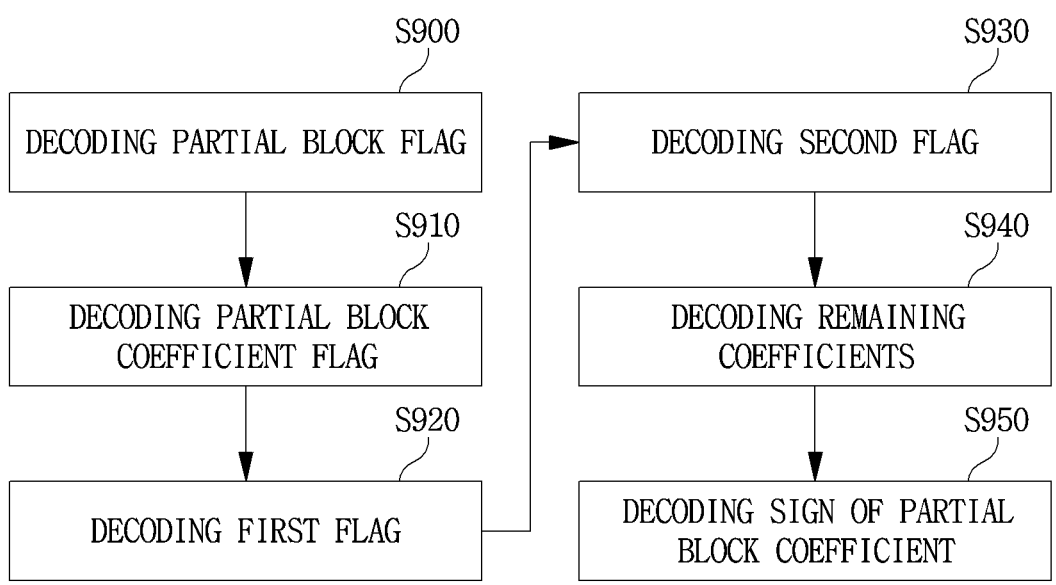
FIG. 9 is a diagram illustrating a method of decoding coefficients of a transform block as an embodiment to which the present invention is applied.

FIG. 9 is a diagram illustrating a method of decoding coefficients of a transform block as an embodiment to which the present invention is applied.

Coefficients of a transform block may be decoded in units of a predetermined block (hereinafter, referred to as a partial block) in an image decoding device. A transform block may include one or more partial blocks. A partial block may be a block of N×M size. Here, N and M are natural numbers, and N and M may be equal to or different from each other. That is, a partial block may be a square or a non-square block. A size/shape of a partial block may be fixed (e.g., 4×4) predefined in an image decoding device, may be variably determined depending on a size/shape of a transform block, or may be variably determined based on signaled information on a size/shape of a partial block. Information on a size/shape of a partial block may be signaled in a level of at least one of a sequence, a picture, a slice or a block.

An order of decoding partial blocks belonging to a transform block may be determined according to a predetermined scan type (hereinafter, referred to as a first scan type) in an image decoding device. In addition, an order of decoding coefficients belonging to a partial block may be determined according to a predetermined scan type (hereinafter, referred to as a second scan type). The first scan type and the second scan type may be the same or different. For the first/second scan type, a diagonal scan, a vertical scan, a horizontal scan and the like may be used. However, the present invention is not limited thereto, and one or more scan types having predetermined angles may be further added. The first/second scan type may be determined based on at least one of coding block related information (e.g., maximum/minimum size, partitioning technique, etc.), size/shape of transform block, size/shape of partial block, prediction mode, intra-prediction related information (e.g., a value of intra-prediction mode, directionality, angle, etc.) or inter-prediction related information.

An image decoding device may decode, in a transform block, position information of a coefficient (hereinafter, referred to as a non-zero coefficient) having non-zero value first appeared in the above-described decoding order. Decoding may be performed sequentially from a partial block according to the position information. Hereinafter, a procedure of decoding coefficients of a partial block will be described with reference to FIG. 9.

A partial block flag for a current partial block may be decoded (S900). The partial block flag may be decoded in units of a partial block. The partial block flag may indicate whether there is at least one non-zero coefficient in the current partial block. For example, when the partial block flag is a first value, it may indicate that the current partial block includes at least one non-zero coefficient, and when the partial block flag is a second value, it may indicate that all coefficients of the current partial block are 0.

A partial block coefficient flag for a current partial block may be decoded (S910). The partial block coefficient flag may be decoded in units of a coefficient. The partial block coefficient flag may indicate whether the coefficient is a non-zero coefficient. For example, when the partial block coefficient flag is a first value, it may indicate that the coefficient is a non-zero coefficient, and when the partial block coefficient flag is a second value, it may indicate that the coefficient is zero. The partial block coefficient flag may be selectively decoded according to the partial block flag. For example, a current partial block may be decoded for each coefficient of a partial block only when there is at least one non-zero coefficient present in the current partial block (i.e., the partial block flag is a first value).

A flag (hereinafter, referred to as a first flag) indicating whether an absolute value of a coefficient is greater than 1 may be decoded (S920). The first flag may be selectively decoded according to a value of the partial block coefficient flag. For example, when the coefficient is a non-zero coefficient (i.e., the partial block coefficient flag is a first value), the first flag may be decoded to check whether the absolute value of the coefficient is greater than 1. When the first flag is a first value, the absolute value of the coefficient is greater than 1, and when the first flag is a second value, the absolute value of the coefficient may be 1.

A flag (hereinafter, referred to as a second flag) indicating whether an absolute value of a coefficient is greater than 2 may be decoded (S930). The second flag may be selectively decoded according to a value of the first flag. For example, when the coefficient is greater than 1 (i.e., the first flag is a first value), the second flag may be decoded to check whether the absolute value of the coefficient is greater than 2. When the second flag is a first value, the absolute value of the coefficient is greater than 2, and when the second flag is a second value, the absolute value of the coefficient may be 2.

The number of at least one of the first flag or the second flag may be at least one to at most N*M. Alternatively, at least one of the first flag or the second flag may be a fixed number (e.g., one, two, or more) predefined in an image decoding device. The number of the first/second flag may be different depending on a bit depth of an input image, a dynamic range of an original pixel value in a certain region of an image, a block size/depth, a partitioning technique (e.g., quad tree, binary tree), a transforming technique (e.g., DCT, DST), whether to skip transform, quantization parameters, prediction mode (e.g., intra/inter mode), and so on. In addition to the first/second flag, an n-th flag indicating whether an absolute value of a coefficient is greater than n may be additionally decoded. Here, n may mean a natural number greater than two. The number of the n-th flag may be one, two, or more, and may be determined in the same/similar manner as the first/second flag described above.

Remaining coefficients that are not decoded based on the first/second flag may be decoded in a current partial block (S940). Here, the decoding may be a procedure of decoding the coefficient value itself. The remaining coefficients may be equal to or greater than two.

A sign for a coefficient of a partial block may be decoded (S950). The sign may be decoded in a flag format in units of a coefficient. The sign may be selectively decoded according to a value of the partial block coefficient flag described above. For example, the sign may be decoded only when the coefficient is a non-zero coefficient (i.e., the partial block coefficient flag is a first value).

In addition, above-described decoding coefficients of a partial block may further include a procedure of specifying a range of coefficient values belonging to the partial block. Through the above procedure, it may be confirmed whether or not at least one non-zero coefficient exists in a partial block. The above procedure may be implemented through at least one of (A) decoding a maximum value, (B) decoding a first threshold value flag or (C) decoding a second threshold value flag which will be described below. The above procedure may be implemented by being included in any one of the above-described steps S900 to S950, or may be implemented in a form that is substituted for at least one of steps S900 to S950. Hereinafter, the procedure of specifying a range of coefficient values belonging to a partial block will be described in detail with reference to FIG. 10 to FIG. 11.

Figure 10:
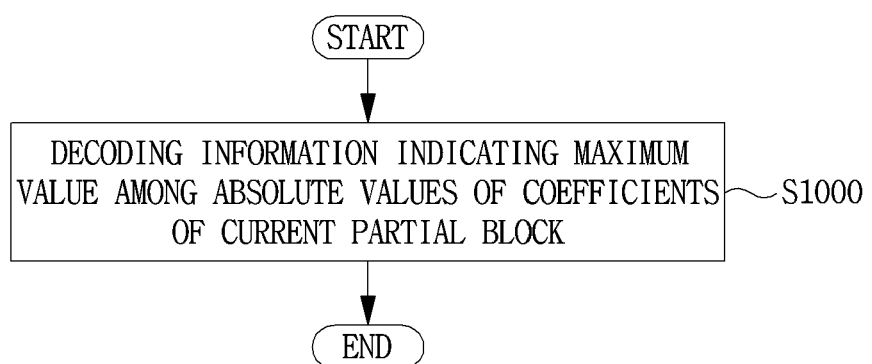
FIG. 10 is a diagram illustrating a method of decoding a maximum value of a coefficient of a partial block as an embodiment to which the present invention is applied.

FIG. 10 is a diagram illustrating a method of decoding a maximum value of a coefficient of a partial block as an embodiment to which the present invention is applied.

Referring to FIG. 10, information indicating a maximum value among absolute values of coefficients of a current partial block may be decoded (S1000). A range of coefficient values belonging to the current partial block may be inferred through the maximum value according to the information. For example, when the maximum value is m, coefficients of the current partial block may fall within the range of 0 to m. The information indicating the maximum value may be selectively decoded according to a value of the partial block flag described above. For example, a current partial block may be decoded only when the current partial block includes at least one non-zero coefficient (i.e., the partial block flag is a first value). When coefficients of the current partial block are all 0 (i.e., the partial block flag is the second value), the information indicating the maximum value may be derived as zero.

Also, through the maximum value according to the information, it may be determined whether or not at least one non-zero coefficient is included in a current partial block. For example, when the maximum value is greater than 0, the current partial block includes at least one non-zero coefficient, and when the maximum value is 0, all coefficients of the current partial block may be zero. Therefore, the decoding the maximum value may be performed in place of the decoding of the partial block flag of S900.

Figure 11:
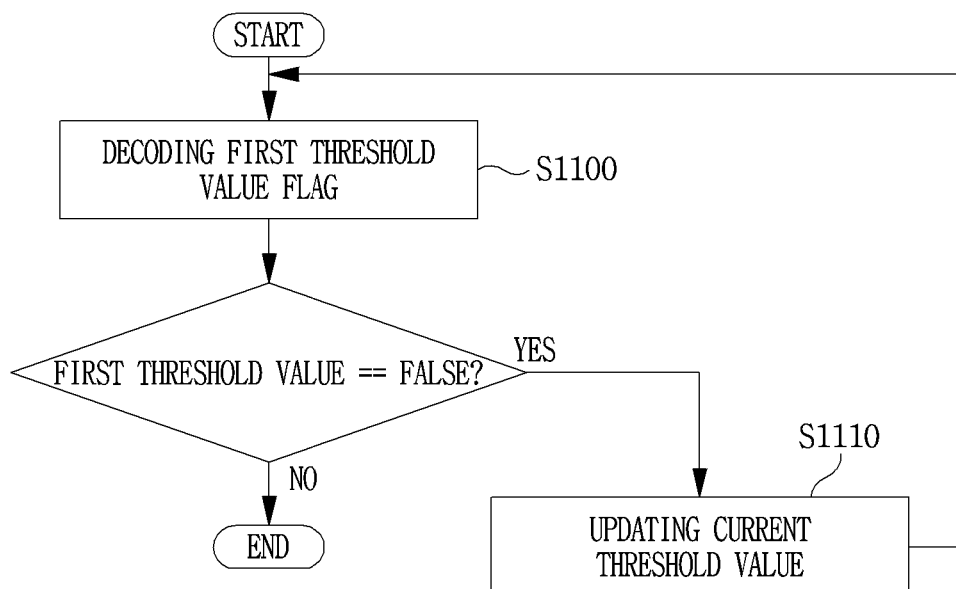
FIG. 11 is a diagram illustrating a method of decoding a first threshold value flag for a partial block as an embodiment to which the present invention is applied.

FIG. 11 is a diagram illustrating a method of decoding a first threshold value flag for a partial block as an embodiment to which the present invention is applied.

A first threshold flag of the present invention may indicate whether or not all coefficients of a partial block are smaller than a predetermined threshold value. The number of threshold values may be N (N>=1), where a range of threshold values may be represented by $\{T_0, T_1, T_2, \ldots, T_{N-1}\}$. Here, the 0th threshold value $T_0$ may denote a minimum value, and the (N−1)-th threshold value $T_{N-1}$ may denotes a maximum value, and $\{T_0, T_1, T_2, \ldots, T_{N-1}\}$ may be those in which the threshold values are arranged in ascending order. The number of threshold values may be predetermined in an image decoding device or may be determined based on signaled information on the number of threshold values.

The threshold value may be obtained by setting a minimum value to 1 and increasing the minimum value by n(n>=1). The threshold value may be set in an image decoding device or may be determined based on signaled information on a threshold value.

A range of threshold values may be determined differently depending on a quantization parameter (QP). The QP may be set at a level of at least one of a sequence, a picture, a slice, or a transform block.

For example, when the QP is larger than a predetermined QP threshold value, a range of threshold values may be determined as $\{3\}$, or the first/second threshold value flag decoding procedure may be omitted, and through the above-described steps of S900 to S950 coefficients of a partial block may be decoded.

In addition, when the QP is smaller than a predetermined QP threshold, a range of threshold values may be determined as $\{3, 5\}$ or $\{5, 3\}$.

That is, a range of threshold values when the QP is small may have the number and/or size (e.g., maximum value) of threshold values different from a range of threshold values when the QP is large. The number of QP threshold values may be one, two, or more. The QP threshold value may be set in an image decoding device. For example, the QP threshold value may correspond to a median value of a range of QPs available in an image decoding device. Alternatively, the QP threshold value may be determined based on information on the QP threshold value signaled by an image encoding device.

Alternatively, a range of threshold values may be determined differently depending on a size/shape of a block. Here, a block may mean a coding block, a prediction block, a transform block, or a partial block. The size may be represented by at least one of a width, a height, a sum of a width and a height, or the number of coefficients.

For example, when a block size is smaller than a predetermined threshold size, a range of threshold values may be determined as $\{3\}$, or the first/second threshold value flag decoding procedure may be omitted, and coefficients of a partial block may be decoded through steps S900 to S950 described above. In addition, when a block size is larger than a predetermined threshold size, a range of threshold values may be determined as $\{3, 5\}$ or $\{5, 3\}$.

That is, a range of threshold values when a block size is small may have the number and/or size (e.g., maximum value) of threshold values different from a range of threshold values when a block size is large. The number of threshold size may be one, two, or more. The threshold size may be set in an image decoding device. For example, the threshold size may be represented by a×b, where a and b are 2, 4, 8, 16, 32, 64 or more, and a and b may be the same or different. Alternatively, the threshold size may be determined based on information on a threshold size signaled by an image encoding device.

Alternatively, a range of threshold values may be determined differently depending on a range of pixel values. The range of pixel values may be represented by a maximum value and/or a minimum value of pixels belonging to a predetermined region. Here, the predetermined region may mean at least one of a sequence, a picture, a slice, or a block.

For example, when a difference between a maximum value and a minimum value of a range of pixel values is smaller than a predetermined threshold difference value, a range of threshold values may be determined as $\{3\}$, or the first/second threshold value flag decoding procedure may be omitted, and coefficients of a partial block may be decoded through steps S900 to S950 described above. In addition, when the difference is larger than a predetermined threshold difference value, the range of threshold values may be determined as $\{3, 5\}$ or $\{5, 3\}$.

That is, a range of threshold values when the difference is small may have the number and/or size (e.g., maximum value) of threshold values different from a range of threshold values when the difference is large. The number of threshold difference values may be one, two, or more. The threshold difference value may be set in an image decoding device or may be determined based on information on a threshold difference value signaled by an image encoding device.

Referring to FIG. 11, a first threshold value flag for a current threshold value may be decoded (S1100).

The first threshold value flag may indicate whether absolute values of all coefficients of a partial block are smaller than a current threshold value. For example, when the first threshold value flag is "false", it may indicate that absolute values of all coefficients of a partial block are greater than or equal to a current threshold. In addition, when the first threshold value flag is "true", it may indicate that absolute values of all coefficients of a partial block are smaller than a current threshold value.

When the first threshold value flag is "false", the current threshold value (i-th threshold value) may be updated to the next threshold value ((i+1-th threshold value) (S1110), based on the updated current threshold value, step S1100 described above may be performed.

When the current threshold value reaches a maximum value of threshold values or when the number of threshold values is 1, the current threshold value may be updated by adding a predetermined constant to the current threshold value. The predetermined constant may be an integer greater than or equal to one. Here, the update may be repeatedly performed until the first threshold value that is "true" is decoded. Alternatively, when the current threshold value reaches a maximum value of threshold values or when the number of threshold values is 1, the updating procedure may be terminated.

As shown in FIG. 11, when the first threshold value flag is "true", decoding of a first threshold value flag may not be performed any more.

As described above, when a first threshold value flag for the i-th threshold value is "true", it may indicate that absolute values of all coefficients in a partial block are smaller than the i-th threshold value. In addition, when a first threshold flag for the i-th threshold value is "false", it may indicate that absolute values of all coefficients in a partial block are greater than or equal to the i-th threshold value. Based on the first threshold value flag that is "true", a range of coefficient values belonging to a partial block may be specified. That is, when a first threshold value flag for the i-th threshold value is "true", a coefficient belonging to a partial block may fall within a range of 0 to (i-th threshold value−1).

According to the decoded first threshold value flag, at least one of steps S900 to S950 described above may be omitted.

For example, when a range of threshold values is {3, 5}, at least one of a first threshold value flag for the threshold value "3" or a first threshold value flag for the threshold value "5" may be decoded. When the first threshold value flag for the threshold value "3" is "true", absolute values of all coefficients in a partial block may fall within the range of 0 to 2. In this case, coefficients of a partial block may be decoded by performing the remaining steps except at least one of the steps S930 or S940 described above, or coefficients of a partial block may be decoded by performing the remaining steps except at least one of the steps S900, S930 or S940 described above.

When the first threshold value flag for the threshold value "3" is "false", the first threshold value flag for the threshold value "5" may be decoded. When the first threshold value flag for the threshold value "5" is "false", at least one of absolute values of coefficients in a partial block may be greater than or equal to 5. In this case, coefficients of a partial block may be decoded by performing the above-described steps S900 to S950 in the same manner, or coefficients of a partial block may be decoded by performing the remaining steps except step S900.

In addition, when the first threshold value flag for the threshold value "5" is "true", absolute values of all coefficients in a partial block may fall within the range of 0 to 4. In this case, coefficients of a partial block may be decoded by performing the above-described steps S900 to S950 in the same manner, or coefficients of a partial block may be decoded by performing the remaining steps except step S900.

In addition, a first threshold value flag of a current partial block may be derived based on a first threshold value flag of another partial block. In this case, decoding procedure for a first threshold value flag may be omitted, and this will be described with reference to FIG. 12.

Figure 12:
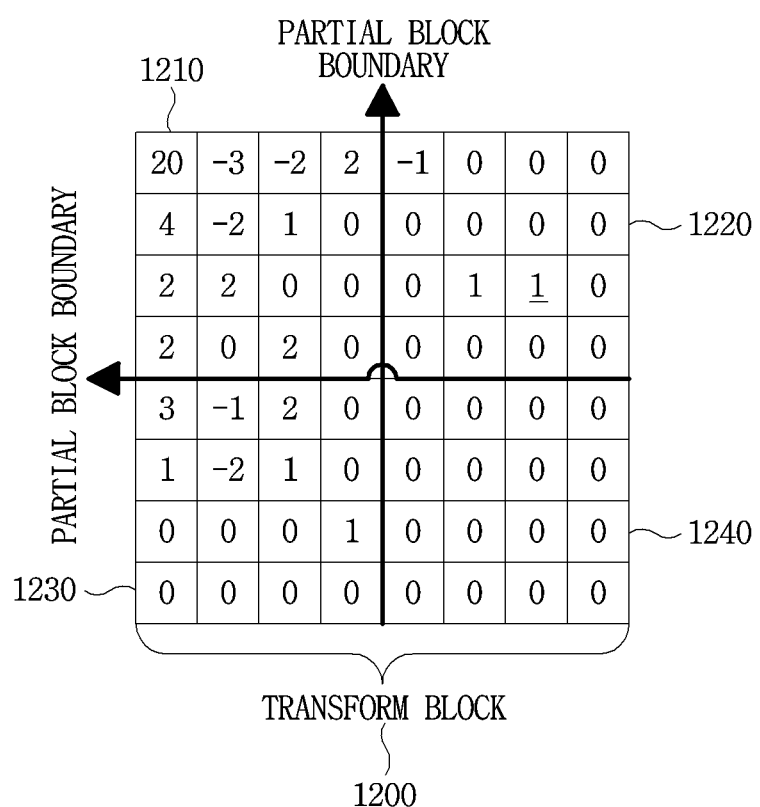
FIG. 12 is a diagram illustrating a method of deriving a first/second threshold value flag for a current partial block as an embodiment to which the present invention is applied.

FIG. 12 is a diagram illustrating a method of deriving a first/second threshold value flag for a current partial block as an embodiment to which the present invention is applied.

In this embodiment, it is assumed that a transform block 1100 is 8×8, a partial block is 4×4, a block including a non-zero coefficient that is first appeared is 1220, and partial blocks of the transform block are encoded/decoded in an order of 1240, 1220, 1230, 1210 depending on scan type.

In a current partial block, a first threshold value flag for a particular threshold value may be derived based on a first threshold value flag of a previous partial block. For example, based on a first threshold value flag that is "false" in a previous partial block, a first threshold value flag of a current partial block may be derived as "false". Here, it is assumed that {3, 5, 7} is used as a range of threshold values.

Specifically, since the partial block 1240 which is a first place in the encoding/decoding order has earlier encoding/decoding order than a position of the partial block 1220 to which a non-zero coefficient that is first appeared belongs, a first threshold value flag may not be encoded/decoded. In the partial block 1220 which is a second place in the encoding/decoding order, since the first threshold value flag for the threshold value "3" is "true", only the first threshold flag for the threshold value "3" may be encoded/decoded. In the partial block 1230 which is a third place in the encoding/decoding order, since the first threshold value flag for the threshold value "3" is "false" and the first threshold value flag for the threshold value "5" is "true", the first threshold flags for the threshold value "3" and "5" may be respectively encoded/decoded. In the partial block 1210 which is a last place in the encoding/decoding order, the first threshold value flag for the threshold value "3" is "false" and the first threshold value flag for the threshold value "5" is "false". Here, since the first threshold flag for the threshold value "3" in the previous partial block 1230 is "false", it may be expected that the current partial block 1210 has at least one coefficient that has absolute value equal to or greater than 3, the first threshold value flag for the threshold value "3" may be derived as "false".

In a current partial block, a first threshold value flag for a particular threshold value may be derived based on a first threshold value flag of a previous partial block. For example, based on a first threshold value flag that is "false" in a previous partial block, the first threshold value flag of the current partial block may be derived "false".

Hereinafter, referring to FIG. 13 to FIG. 18, a method of determining a partial block of a transform block will be described in detail.

An image encoding device may determine a partial block having a predetermined size/shape constituting a transform block, and may encode information on the size/shape of the partial block. An image decoding device may determine a size/shape of a partial block based on the encoded information (first method). Alternatively, a size/shape of a partial block may be determined through a predetermined rule in an image encoding/decoding device (second method). Information indicating whether to determine a size/shape of a partial block through which one of the first and second methods may be signaled in at least one layer of a video, a sequence, a picture, a slice, or a block. The block may refer to a coding block, a prediction block or a transform block.

A size of a partial block in a transform block may be equal to or smaller than a size of the transform block. A shape of the transform block/partial block may be square or non-square. A shape of a transform block may be the same as or different from a shape of a partial block.

Information on a shape of a transform block may be encoded. Here, the information may include at least one of information on whether to use only a square, a non-square, or both a square and a non-square for a shape of a transform block. The information may be signaled in at least one layer of a video, a sequence, a picture, a slice, or a block. The block may refer to a coding block, a prediction block, or a transform block. Information on a size of a transform block may be encoded. Here, the information may include at least one of a minimum size, a maximum size, a partitioning depth or a maximum/minimum value for a partitioning depth. The information may be signaled in at least one layer of a video, a sequence, a picture, a slice, or a block.

Information on a shape of a partial block may be encoded. Here, the information may include at least one of information on whether to use only a square, a non-square, or both a square and a non-square for a shape of a partial block. The information may be signaled in at least one layer of a video, a sequence, a picture, a slice, or a block. The block may refer to a coding block, a prediction block, or a transform block. Information on a size of a partial block may be encoded. Here, the information may include at least one of a minimum size, a maximum size, a partitioning depth, and a maximum/minimum value for a partitioning depth. The information may be signaled in at least one layer of a video, a sequence, a picture, a slice, or a block.

Figure 13:
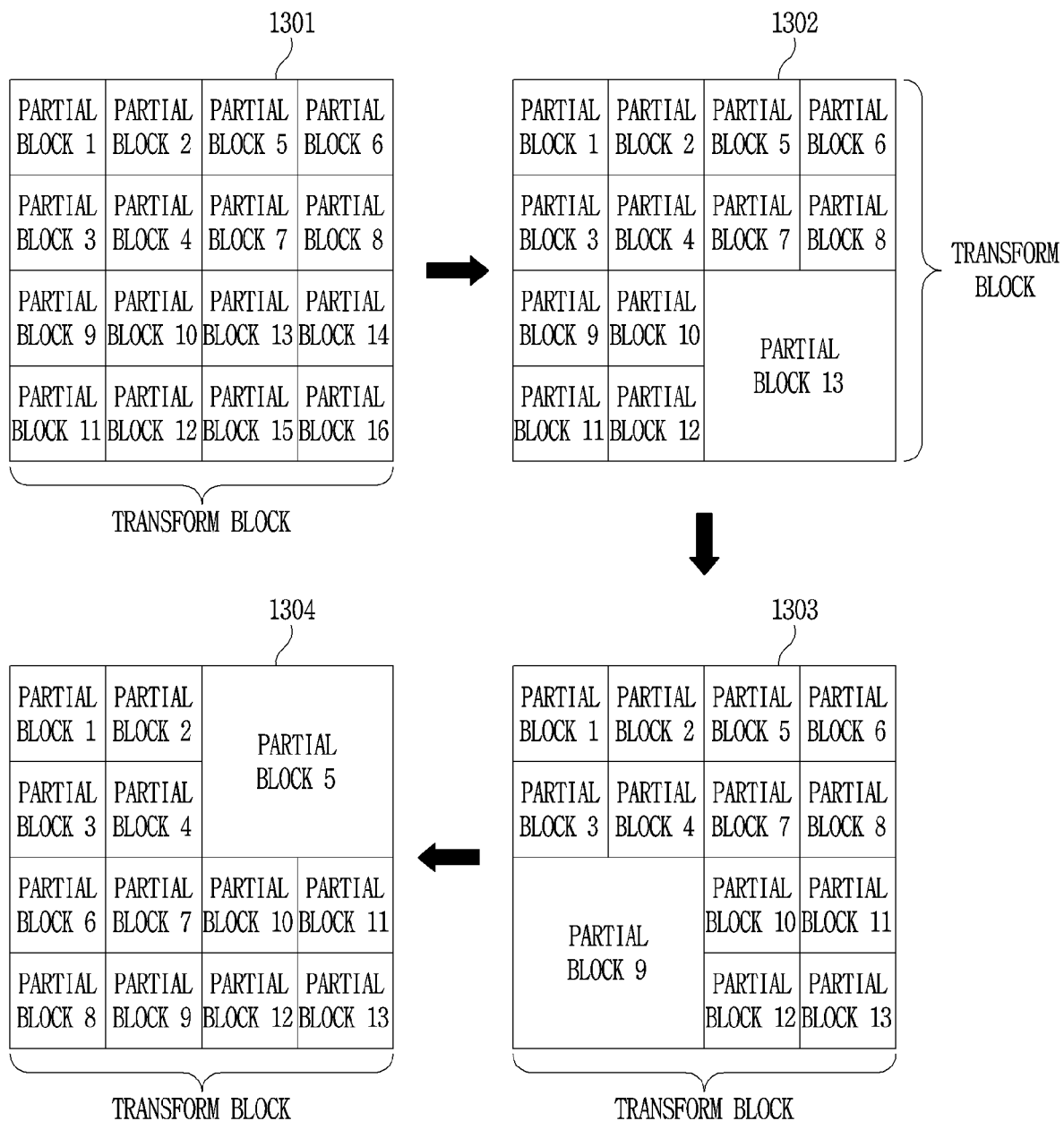
FIG. 13 is a diagram illustrating a method of determining a size/shape of a partial block based on a merge flag as an embodiment to which the present invention is applied.

FIG. 13 is a diagram illustrating a method of determining a size/shape of a partial block based on a merge flag as an embodiment to which the present invention is applied.

An image encoding device may check a partial block in which merge shape is optimal through an RDO from a partial block of a minimum size to a partial block of a maximum size.

Referring to FIG. 13, an RD-cost value for a transform block 1301 including a plurality of partial blocks 1-16 may be calculated. The partial block may be a partial block of a minimum size predetermined in an image encoding device. The transform block 1302 is a case where the four partial blocks 13-16 of the transform block 1301 are merged into one partial block, and an RD-cost value for the transform block 1302 may be calculated. The transform block 1303 is a case where the four partial blocks 9-12 of the transform block 1301 are merged into one partial block, and an RD-cost value for the transform block 1303 may be calculated. The transform block 1304 is a case where the four partial blocks 5-8 of the transform block 1301 are merged into one partial block, and an RD-cost value for the transform block 1304 may be calculated.

An image encoding device may calculate, using a quad tree method, RD-cost values while merging partial blocks in a transform block up to a partial block of a maximum size. An optimal merge is determined based on the RD-cost value, and a merge flag indicating the optimal merge may be encoded. The image decoding device may determine a size/shape of a partial block in a transform block based on the encoded merge flag.

For example, it may be assumed that the transform block 1304 is the optimal merge, the minimum size of the partial block is equal to the size of the partial block "1" of the transform block 1304, and the maximum size of the partial block is equal to the size of the partial block "5" of the transform block 1304. In this case, an image encoding device may encode a merge flag "false" indicating that the transform block 1301 is not an optimal merge. In addition, a merge flag "false" indicating that a state that the four partial blocks 10-13 of transform block 1304 are not merged is an optimal merge may be encoded, and a merge flag "false" indicating that a state that the four partial blocks 6-9 of transform block 1304 are not merged is optimal may be encoded. Further, a merge flag "true" indicating that a state that the four partial blocks 6-9 of transform block 1304 are merged into one partial block is optimal may be encoded, and a merge flag "false" indicating that a state that the four partial blocks 1-4 of transform block 1304 are not merged is optimal may be encoded. That is, the image encoding device may generate a bitstream "00010" through the encoding, and the image decoding device may decode the bitstream to determine a merge shape of the transform block 1304.

FIG. 13 does not limit a merging order of partial blocks, but the partial blocks may be merged in a different order. The above merging may be performed within a range of block size/shape predetermined in the image encoding/decoding device. The shape of the merged partial block may be square or non-square. The shape of the merged partial block may be determined based on an encoding order or a scanning order of the partial blocks.

For example, when an encoding order of partial blocks in a transform block is diagonal direction, square-shaped merge may be used. Alternatively, when an encoding order of partial blocks in a transform block is vertical direction, a vertically long non-square-shaped merge may be used. Alternatively, when an encoding order of partial blocks in a transform block is horizontal direction, horizontally long non-square-shaped merge may be used.

Figure 14:
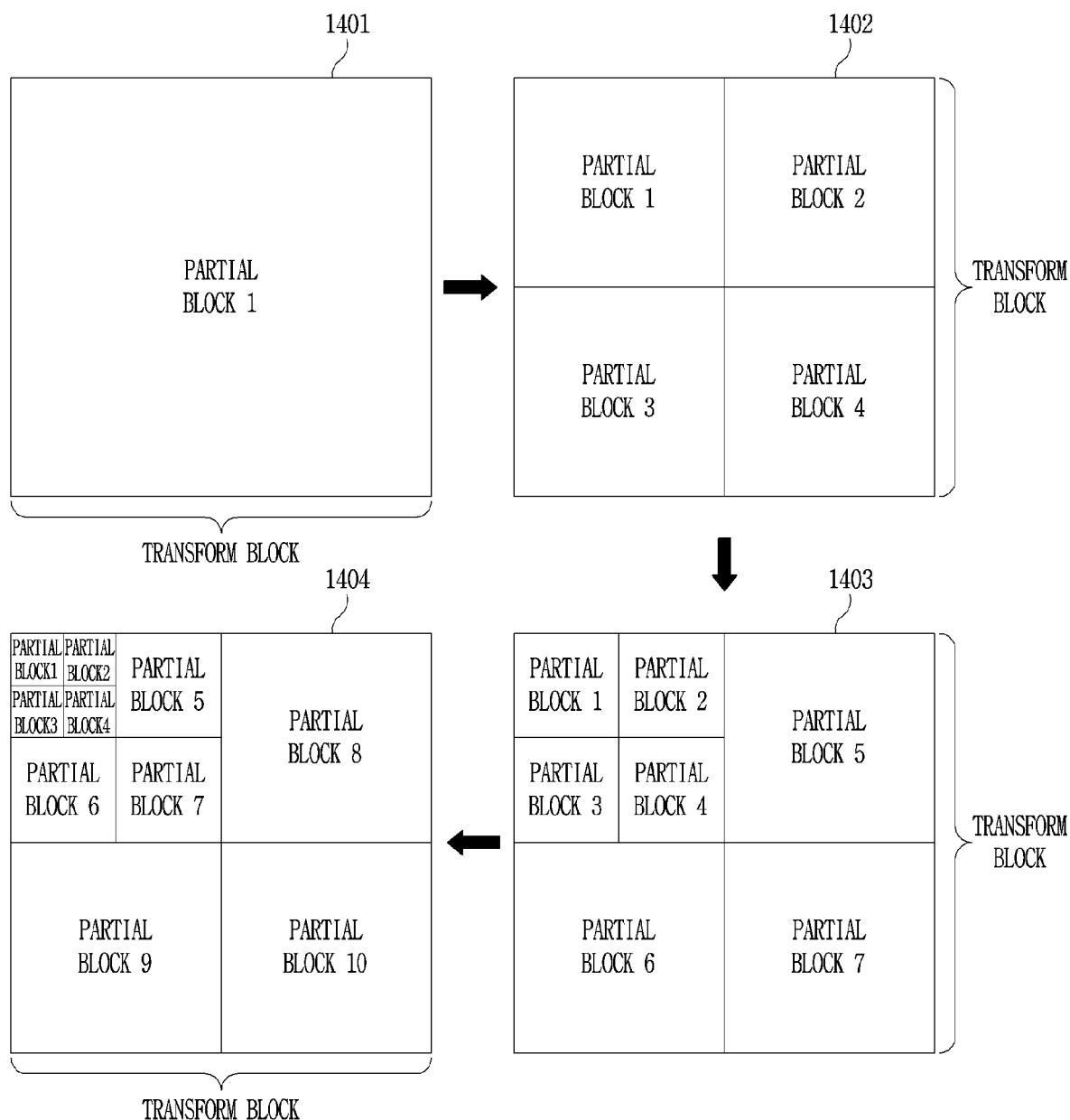
FIG. 14 is a diagram illustrating a method of determining a size/shape of a partial block based on a partitioning flag as an embodiment to which the present invention is applied.

FIG. 14 is a diagram illustrating a method of determining a size/shape of a partial block based on a partitioning flag as an embodiment to which the present invention is applied.

An image encoding device may check a transform block in which partitioning shape is optimal through an RDO from a partial block of a maximum size to a partial block of a minimum size.

Referring to FIG. 14, an RD-cost value for a transform block 1401 including one partial block 1 may be calculated. The partial block 1 may be a partial block of a maximum size predetermined in an image encoding device. The transform block 1302 is a case where a maximum size partial block is partitioned into four partial blocks 1-4, and an RD-cost value for the transform block 1302 may be calculated. The transform block 1403 is a case where a partial block 1 of the transform block 1401 is partitioned into four partial blocks 1-4, and an RD-cost value for the transform block 1403 may be calculated. The transform block 1404 is a case where a partial block 1 of the transform block 1403 is partitioned again into four partial blocks 1-4, and an RD-cost value for the transform block 1404 may be calculated.

An image encoding device may calculate, using a quad tree method, RD-cost values while partitioning partial blocks in a transform block up to a partial block of a minimum size. An optimal partitioning is determined based on the RD-cost value, and a partitioning flag indicating the optimal partitioning may be encoded. The image decoding device may determine a size/shape of a partial block in a transform block based on the encoded partitioning flag.

For example, it may be assumed that the transform block 1403 is the optimal partitioning, the minimum size of the partial block is equal to the size of the partial block "1" of the transform block 1403, and the maximum size of the partial block is equal to the size of the transform block 1403. In this case, an image encoding device may encode a partitioning flag "true" indicating that the transform block 1401 is not an optimal partitioning. In addition, a partitioning flag "true" indicating that a state that the partial block '1' of the transform block 1402 is partitioned into four partial blocks is an optimal partitioning may be encoded. A partitioning flag "false" indicating that a state that the remaining partial blocks 2-4 of the transform block 1402 are not partitioned into four partial blocks is an optimal partitioning may be encoded. That is, the image encoding device may generate a bitstream "11000" through the encoding, and the image decoding device may decode the bitstream to determine a partitioning shape of the transform block 1403.

FIG. 14 does not limit a partitioning order of partial blocks, but the partial blocks may be partitioned a in a different order. The above-described partitioning may be performed within a range of block size/shape predetermined in the image encoding/decoding device. The shape of the partitioned partial block may be square or non-square. The shape of the partitioned partial block may be determined based on an encoding order or a scanning order of the partial blocks.

For example, when an encoding order of partial blocks in a transform block is diagonal direction, square-shaped partitioning may be used. Alternatively, when an encoding order of partial blocks in a transform block is vertical direction, a vertically long non-square-shaped partitioning may be used. Alternatively, when an encoding order of partial blocks in a transform block is horizontal direction, horizontally long non-square-shaped partitioning may be used.

Figure 15:
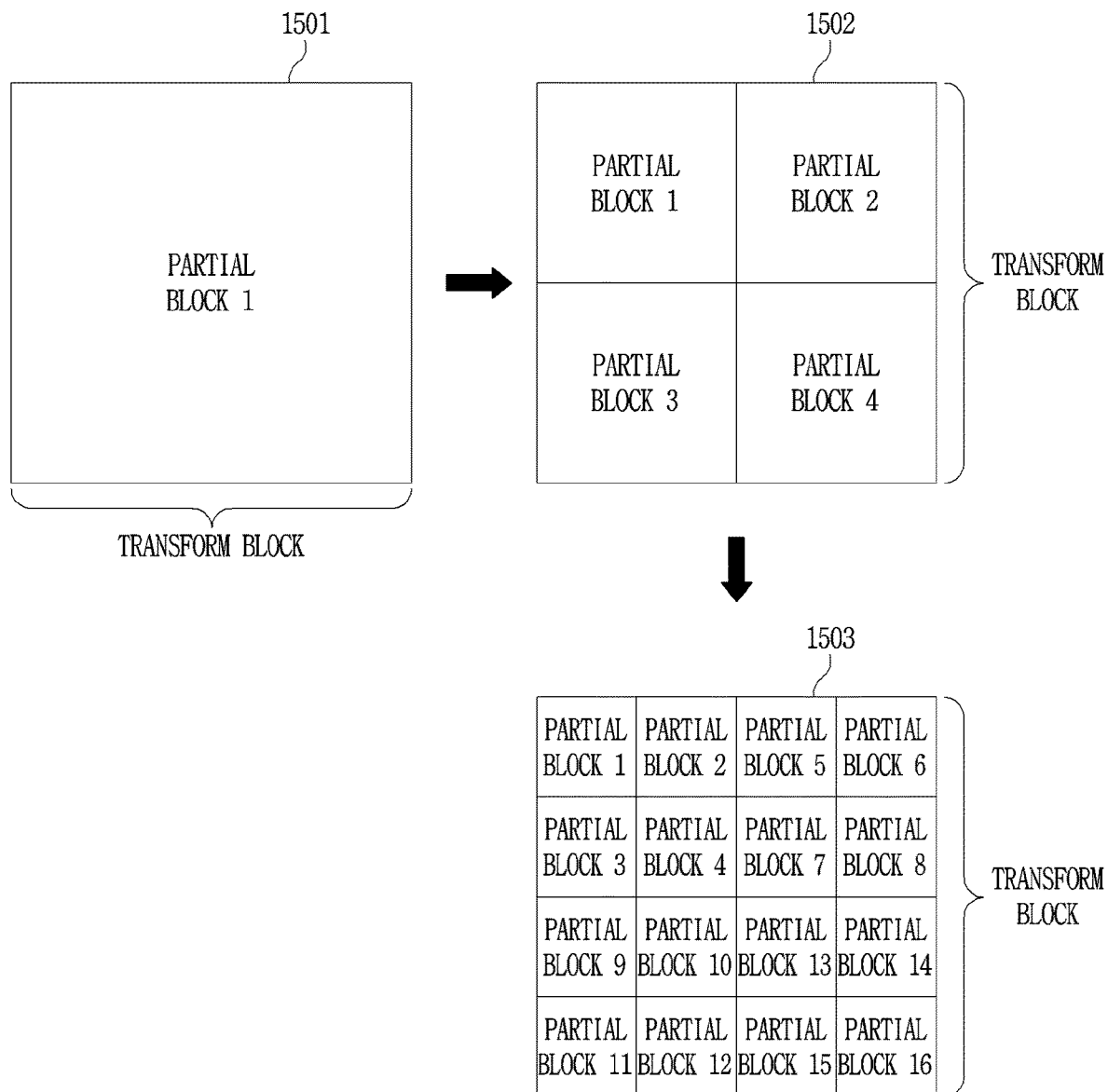
FIG. 15 is a diagram illustrating a method of determining a size/shape of a partial block based on partitioning index information as an embodiment to which the present invention is applied.

FIG. 15 is a diagram illustrating a method of determining a size/shape of a partial block based on partitioning index information as an embodiment to which the present invention is applied.

An image encoding device may determine which partitioning shape of a partial block is the most optimal through RDO, from when all partial blocks of a transform block have maximum size until when all partial blocks have minimum size.

Referring to FIG. 15, a transform block 1501 is composed of one partial block 1, and an RD-cost value in this case may be calculated. The partial block 1 may be a partial block of a maximum size predefined in an image encoding device. A transform block 1502 is a case where the transform block 1501 is partitioned into four partial blocks 1-4, and an RD-cost value in this case may be calculated. A transform block 1503 is a case where each partial block of the transform block 1502 is again partitioned into four partial blocks, and an RD-cost value in this case may be calculated.

As described above, within a range of a partial block of a maximum size to a minimum size, RD-cost values may be calculated while partitioning a transform block into partial blocks of the same size. An optimal partitioning is determined based on the RD-cost values, and a partitioning index information indicating optimal partitioning may be encoded. An image decoding device may determine a size/shape of a partial block in a transform block based on the encoded partitioning index information.

For example, when a transform block 1501 is the optimum partitioning, an image encoding device may encode "0" as a partitioning index information, and when a transform block 1502 is the optimum partitioning, an image encoding device may encode "1" as a partitioning index information, when a transform block 1503 is the optimum partitioning, an image encoding device may encode "2" as a partitioning index information, respectively. An image decoding device may determine a size/shape of a partial block in a transform block based on the encoded partitioning index information.

Figure 16:
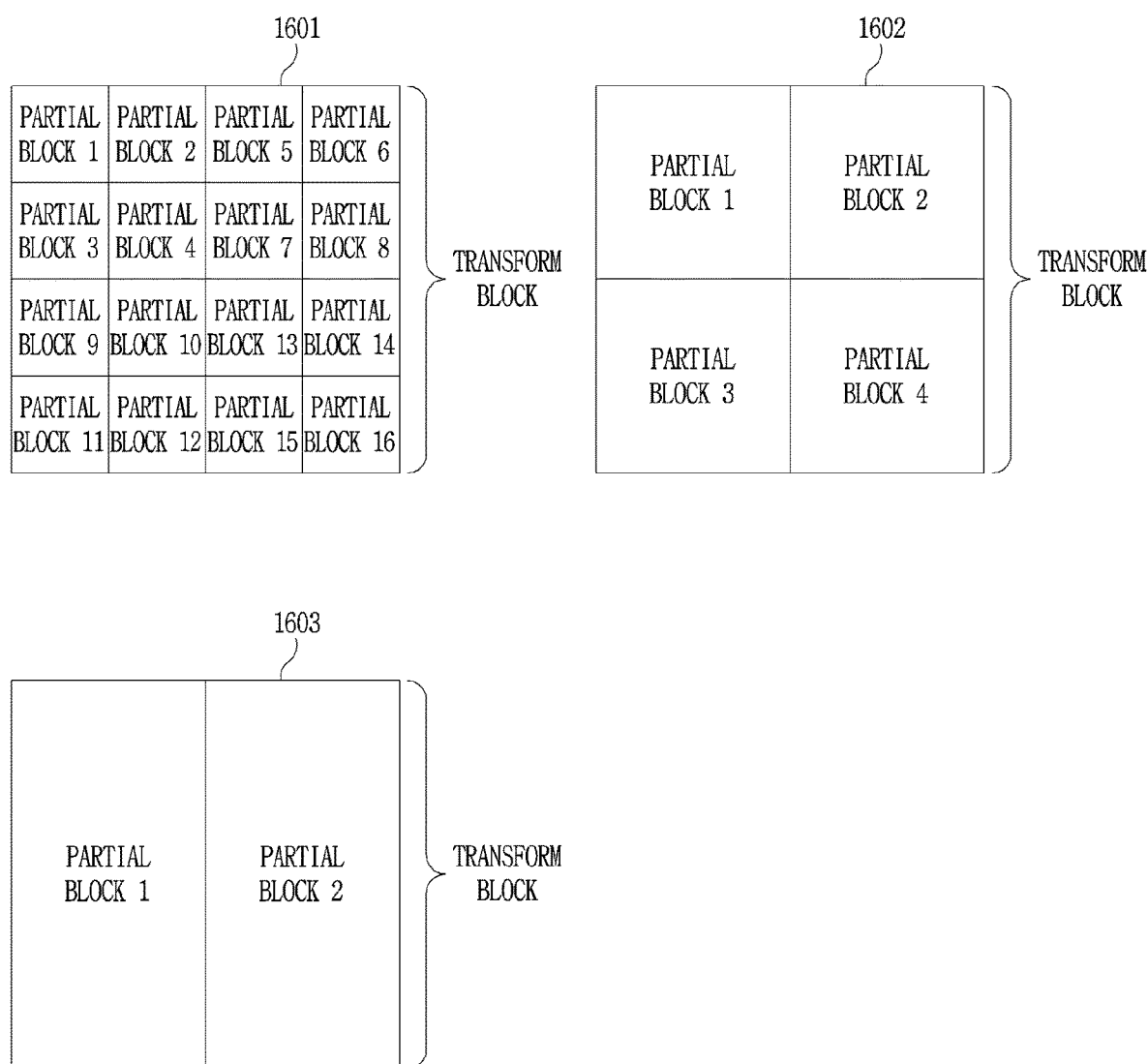
FIG. 16 is a diagram illustrating a method of partitioning a transform block based on a position of a non-zero coefficient as an embodiment to which the present invention is applied.

FIG. 16 is a diagram illustrating a method of partitioning a transform block based on a position of a non-zero coefficient as an embodiment to which the present invention is applied.

In a transform block, a size/shape of a partial block may be determined based on a position of a non-zero coefficient first appeared in an encoding/decoding order.

A size/shape of a partial block may be determined as a size/shape of a block (hereinafter, referred to as a first reference block) including a position of a non-zero coefficient first appeared. The first reference block may be a block having a minimum size among blocks including the position of the non-zero coefficient first appeared and a position of right bottom coefficient of a transform block. Here, the first reference block may belong to a range of a minimum size and a maximum size of partial blocks predetermined in an image encoding/decoding device. The transform block may be partitioned according to the determined size/shape of partial blocks.

For example, when a transform block 1601 is 16×16 and a position of a non-zero coefficient first appeared in an encoding/decoding order is (12, 12) with respect to left top (0, 0) of the transform block, a size of a partial block including the coefficient (12, 12) may be determined as 4×4, and the transform block 1601 may be partitioned into 16 partial blocks of 4×4 size as shown in FIG. 16. Alternatively, when the transform block 1602 is 16×16 and a position of a non-zero coefficient first appeared in an encoding/decoding order is (8, 8) with respect to left top (0, 0) of the transform block, a size of a partial block including the coefficient (8, 8) may be determined as 8×8, and the transform block 1602 may be partitioned into 4 partial blocks of 8×8 size as shown in FIG. 16. Alternatively, when the transform block 1603 is 16×16 and a position of a non-zero coefficient first appeared in an encoding/decoding order is (8, 0) with respect to left top (0, 0) of the transform block, a size of a partial block including the coefficient (8, 0) may be determined as 8×16, and the transform block 1603 may be partitioned into 2 partial blocks of 8×16 size.

Alternatively, a size/shape of the partial block may be determined as a size/shape of a block (hereinafter, referred to as a second reference block) that does not include a position of a non-zero coefficient first appeared. The second reference block may be a block having a maximum size among blocks not including the position of the non-zero coefficient first appeared and including a position of right bottom coefficient of a transform block. Here, the second reference block may belong to a range of a minimum size and a maximum size of partial blocks predetermined in an image encoding/decoding device. The transform block may be partitioned according to the determined size/shape of partial blocks.

For example, when a transform block 1601 is 16×16 and a position of a non-zero coefficient first appeared in an encoding/decoding order is (12, 11) with respect to left top (0, 0) of the transform block, a size of a partial block not including the coefficient (12, 11) may be determined as 4×4, and the transform block 1601 may be partitioned into 16 partial blocks of 4×4 size. Alternatively, when a transform block 1602 is 16×16 and a position of a non-zero coefficient first appeared in an encoding/decoding order is (7, 13) with respect to left top (0, 0) of the transform block, a size of a partial block not including the coefficient (7, 13) may be determined as 8×8, and the transform block 1602 may be partitioned into 4 partial blocks of 8×8 size. Alternatively, when a transform block 1603 is 16×16 and a position of a non-zero coefficient first appeared in an encoding/decoding order is (6, 14) with respect to left top (0, 0) of the transform block, a size of a partial block not including the coefficient (6, 14) may be determined as 8×16, and the transform block 1603 may be partitioned into 2 partial blocks of 8×16 size.

Figure 17:
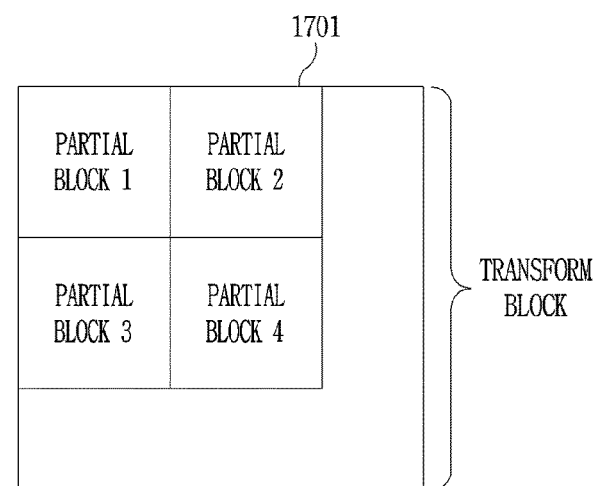
FIG. 17 is a diagram illustrating a method of selectively partitioning a partial region of a transform block as an embodiment to which the present invention is applied.
Figure 17:
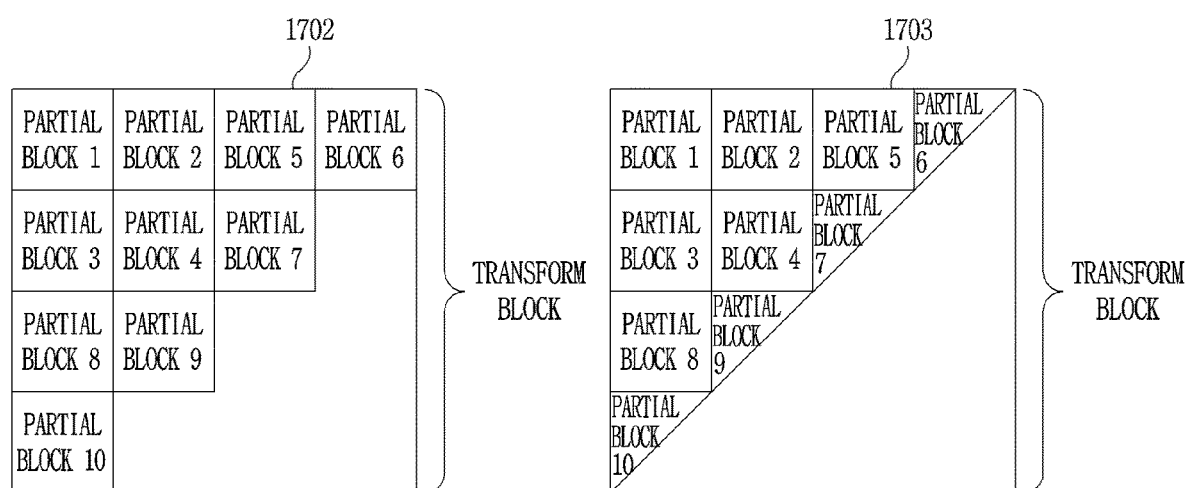

FIG. 17 is a diagram illustrating a method of selectively partitioning a partial region of a transform block as an embodiment to which the present invention is applied.

In a transform block, a remaining region excluding a partial region may be partitioned into partial blocks having a predetermined size/shape. Here, the partial region may be specified based on a position (a, b) of a non-zero coefficient first appeared. For example, the partial region may include at least one of a region having x-coordinate larger than the a or a region having y-coordinate larger than the b. Here, a size/shape of a partial block may be determined in the same/similar manner as the above-described at least one embodiment, and a detailed description thereof will be omitted.

For example, when the transform block 1701 is 16×16 and the position of the non-zero coefficient first appeared in the encoding/decoding order is (11, 11) with respect to left top (0, 0) of the transform block, regions located in right side of x-coordinate of (11, 11) and regions located in bottom side of y-coordinate of (11, 11) may be excluded from a partial block setting range and may not be encoded/decoded. Here, the remaining region of the transform block 1701 may be partitioned into 4 partial blocks of 6×6 size.

Alternatively, in a transform block, a remaining region excluding a partial region may be partitioned into partial blocks having a predetermined size/shape. Here, the partial region may be specified based on a position (a, b) of a non-zero coefficient first appeared and a maximum coordinate value (c, d) of the transform block. The maximum coordinate value (c, d) may be a position of right bottom coefficient of the transform block. For example, "(c-a)" and "d-b" which are differences between the position (a, b) of the non-zero coefficient first appeared and the maximum coordinate value (c, d) of the transform block may be calculated, respectively. A position (e, f) shifted by a minimum value of the difference value may be determined with respect to the position of the right bottom coefficient of the transform block. Here, the partial region may include at least one of a region having x-coordinate larger than the e or a region having y-coordinate larger than the f. Here, a size/shape of a partial block may be determined in the same/similar manner as the above-described at least one embodiment, and a detailed description thereof will be omitted.

For example, when the transform block 1701 is 16×16 and the position of the non-zero coefficient first appeared in the encoding/decoding order is (11, 8) with respect to left top (0, 0) of the transform block, a difference "4" between the x-coordinate "11" of the corresponding coefficient and the maximum x-coordinate "15" of the transform block may be calculated, and a difference "7" between the y-coordinate "8" of the corresponding coefficient and the maximum y-coordinate "15" of the transform block may be calculated. With respect to the position of the right bottom coefficient of the transform block, a position shifted by a minimum value "4" among the difference values may be determined as (11, 11). In this case, regions located in right side of x-coordinate of (11, 11) and regions located in bottom side of y-coordinate of (11, 11) may be excluded from a partial block setting range and may not be encoded/decoded. Here, the remaining region of the transform block 1701 may be partitioned into 4 partial blocks of 6×6 size.

Alternatively, the transform block may be partitioned into a plurality of regions based on a predetermined boundary line. The boundary line may be one, two, or more. The boundary line has a slope of a predetermined angle, and the angle may fall within a range of 0 to 90 degrees. The boundary line may include the position of the non-zero coefficient first appeared in the encoding/decoding order of coefficients in the transform block. Specifically, with respect to the boundary line, the transform block may be partitioned into a first region and a second region. Here, the first region may be partitioned into partial blocks having a predetermined size/shape, and the second region may not be partitioned into partial blocks having a predetermined size/shape. That is, the coefficients belonging to the first region are encoded/decoded based on a partial block having a predetermined size/shape, and encoding/decoding for coefficients belonging to the second region may be skipped. The first region may refer to a region located in a top, left, or left top side with respect to the boundary line. In this case, the first region may further include a partial block region including the boundary line. The second region may refer to a region located in a bottom, right, or right bottom side with respect to the boundary line.

For example, it may be assumed that the transform block 1402 is 16×16, the position of the non-zero coefficient first appeared in the encoding/decoding order is (10, 6) with respect to left top (0, 0) of the transform block, and all partial blocks of the transform block 1402 have been partitioned into 4×4 units. In this case, with respect to (10, 6), the last pixel position in the 45-degree direction to a right top corner is (15, 1) and the last pixel position in the 45-degree direction to a left bottom corner is (1, 15). With respect to the boundary line connecting the two pixel positions, partial blocks 1-10 located in a left top region may be determined as partial blocks to be encoded/decoded, and partial blocks located in a right bottom region may be determined as partial blocks not to be encoded/decoded. Here, shape of partial blocks in the left top region may be determined as a quadrangle and/or a triangle.

For example, it may be assumed that the transform block 1403 is 16×16, the position of the non-zero coefficient first appeared in the encoding/decoding order is (8, 7) with respect to left top (0, 0) of the transform block, and all partial blocks of the transform block 1403 have been partitioned into 4×4 units. In this case, with respect to (8, 7), the last pixel position in the 45-degree direction to a right top corner is (15, 0) and the last pixel position in the 45-degree direction to a left bottom corner is (0, 15). With respect to the boundary line connecting the two pixel positions, partial blocks 1-10 located in a left top region may be determined as partial blocks to be encoded/decoded, and partial blocks located in a right bottom region may be determined as partial blocks not to be encoded/decoded. Here, in case of partial blocks including the boundary line, only the coefficients in the left top region with respect to the boundary line may be included in the partial blocks, and the coefficients in the right bottom region may be excluded from the partial block. The shape of partial block in the left top region may be determined as a quadrangle (partial blocks 1-5, 8) and/or a triangle (partial blocks 6, 7, 9, 10).

Figure 18:
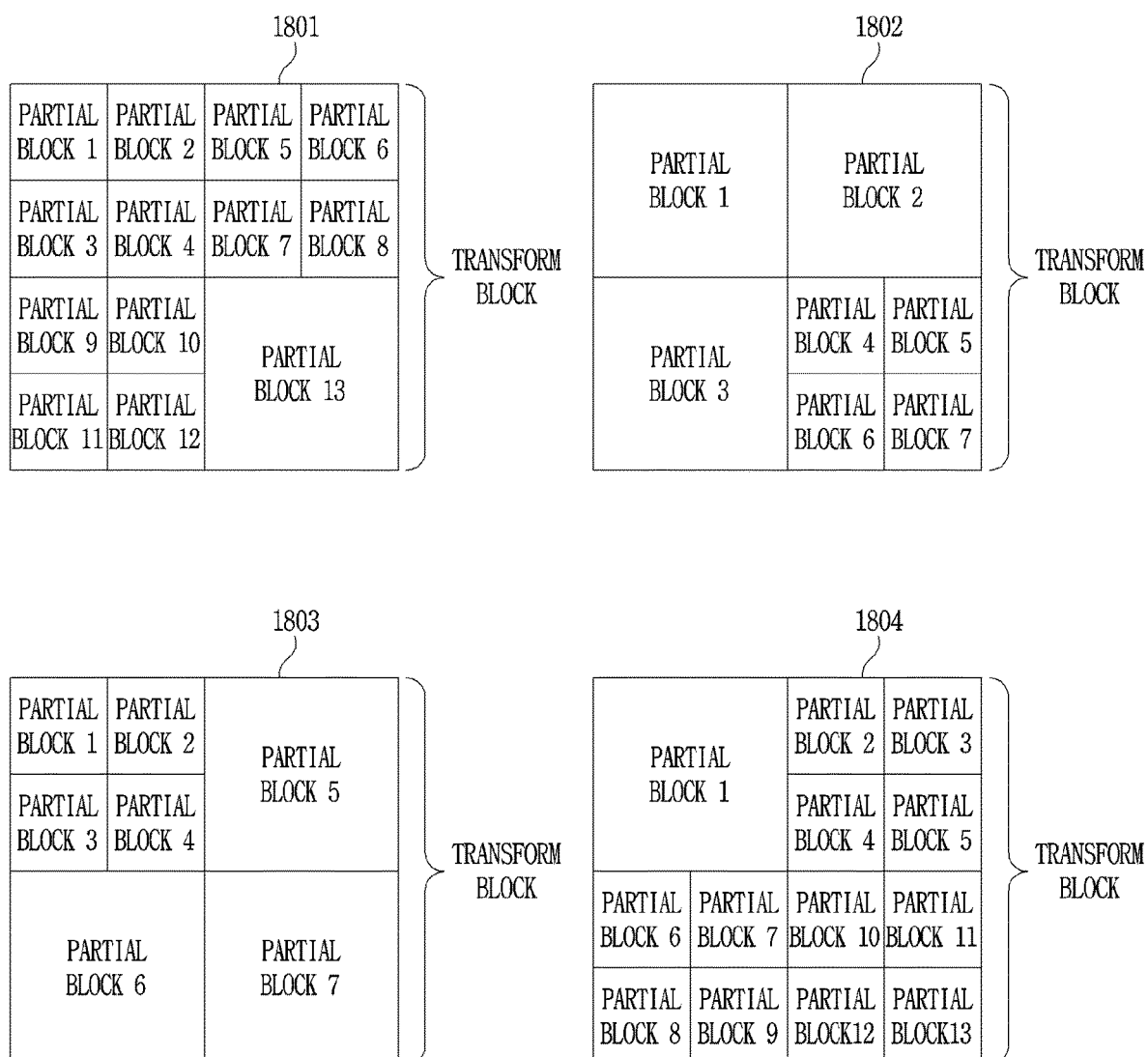
FIG. 18 is a diagram illustrating a method of partitioning a transform block based on DC/AC component attribute in a frequency domain as an embodiment to which the present invention is applied.

FIG. 18 is a diagram illustrating a method of partitioning a transform block based on DC/AC component attribute in a frequency domain as an embodiment to which the present invention is applied.

In a frequency domain, a partitioning shape of a transform block may be determined in consideration of an attribute of DC/AC component included in the transform block. The attribute may refer to a component position, a degree of distribution, a degree of concentration, strength and weakness, or the like, and the attribute may be determined depending on a transform method (e.g., DCT, DST, etc.) of the transform block.

In a transform block, a region where the AC component is most weakly concentrated may be partitioned into a partial block larger in size than the remaining region. For example, in a transform block 1801 of 16×16 size, the AC component may be located mostly in partial blocks "5" to "13". Here, a partial block of 8×8 size may be allocated only to the partial block 13 in which the AC component is most weakly concentrated, and a partial block of 4×4 size may be allocated to the remaining region.

Alternatively, in a transform block, a region where the AC component is most weakly concentrated may be partitioned into a partial block smaller in size than the remaining region.

For example, in a transform block 1802 of 16×16 size, the AC component may be located mostly in partial blocks "2" to "7". Here, a partial block of 4×4 size may be allocated only to the partial blocks "4" to "7" in which the AC component is most weakly concentrated, and a partial block of 8×8 size may be allocated to the remaining region.

Alternatively, in a transform block, a region where the DC component is most strongly concentrated may be partitioned into a partial block smaller in size than the remaining region. For example, in a transform block 1803 of 16×16 size, the DC component may be located mostly in partial blocks "1" to "4". Here, a partial block of 4×4 size may be allocated only to the partial blocks "1" to "4" in which the DC component is most strongly concentrated, and a partial block of 8×8 size may be allocated to the remaining region.

Alternatively, in a transform block, a region where the DC component is most strongly concentrated may be partitioned into a partial block larger in size than the remaining region. For example, in a transform block 1804 of 16×16 size, the DC component may be located mostly in partial block "1". Here, a partial block of 8×8 size may be allocated only to the partial blocks "1" in which the DC component is most strongly concentrated, and a partial block of 4×4 size may be allocated to the remaining region.

In the above-described embodiment, the DC/AC component region in the transform block is assumed based on the quadrisected transform block. However, the present invention is not limited thereto, and the same/similar may be applied to a transform block of N (N≥≥1) equally partitioned or 2 to the power of N equally partitioned.

Depending on a quantization parameter (QP) of a transform block, all or some of partial blocks in the transform block may be selectively encoded/decoded. For example, when the QP of the transform block is larger than a predetermined QP threshold value, only a partial region in the transform block may be encoded/decoded. In addition, when the QP of the transform block is smaller than a predetermined QP threshold value, all partial blocks in the transform block may be encoded/decoded.

Here, the partial region may be specified by at least one of a predetermined vertical line or a horizontal line. The vertical line may be located apart from a left boundary of a transform block by a distance a to the left direction, and the horizontal line may be located apart from a top boundary of a transform block by a distance b to the bottom direction. The a and b are natural numbers, and may be the same or different from each other. The partial region may be a region located on a left side with respect to the vertical line and/or on an upper side with respect to the horizontal line. The position of the vertical/horizontal line may be predetermined in an image encoding/decoding device, or may be variably determined in consideration of a size/shape of a transform block. Alternatively, an image encoding device may encode information specifying a partial region (e.g., information for specifying a position of the vertical/horizontal line) and signal the information, and an image decoding device may specify a partial region based on the signaled information. A boundary of the specified partial region may or may not be in contact with a boundary of a partial block in a transform block.

For example, the partial region may be one partial block of a region where DC components are concentrated or N partial blocks (N≥≥1) further including an adjacent partial block. Alternatively, the partial region may be specified by a vertical line crossing 1/n point of a top boundary of a transform block and/or a horizontal line crossing 1/m point of a left boundary of a transform block. The n and m are natural numbers and may be the same or different from each other.

The number of QP threshold values may be one, two, or more. A QP threshold value may be predetermined in an image encoding device. For example, the QP threshold value may correspond to a median value of a range of QPs available in an image encoding/decoding device. Alternatively, an image encoding device may determine an optimal QP threshold value considering encoding efficiency, and may encode the QP threshold.

Alternatively, depending on a size of a transform block, all or some of partial blocks in the transform block may be selectively encoded/decoded. For example, when a size of a transform block is equal to or greater than a predetermined threshold size, only a partial region in the transform block may be encoded/decoded. In addition, when a size of a transform block is smaller than a predetermined threshold size, all partial blocks in a transform block may be encoded/decoded.

Here, the partial region may be specified by at least one of a predetermined vertical line or a horizontal line. The vertical line may be located apart from a left boundary of a transform block by a distance a to the left direction, and the horizontal line may be located apart from a top boundary of a transform block by a distance b to the bottom direction. The a and b are natural numbers, and may be the same or different from each other. The a may fall within a range of 0 to a width of a transform block, and the b may fall within a range of 0 to a height of a transform block. The partial region may be a region located on a left side with respect to the vertical line and/or on an upper side with respect to the horizontal line. The position of the vertical/horizontal line may be predetermined in an image encoding/decoding device, or may be variably determined in consideration of a size/shape of a transform block. Alternatively, an image encoding device may encode information specifying a partial region (e.g., information for specifying a position of the vertical/horizontal line) and signal the information, and an image decoding device may specify a partial region based on the signaled information. A boundary of the specified partial region may or may not be in contact with a boundary of a partial block in a transform block.

For example, the partial region may be one partial block of a region where DC components are concentrated or N partial blocks (N≥≥1) further including an adjacent partial block. Alternatively, the partial region may be specified by a vertical line crossing 1/n point of a top boundary of a transform block and/or a horizontal line crossing 1/m point of a left boundary of a transform block. The n and m are natural numbers and may be the same or different from each other.

The number of threshold sizes may be one, two, or more. The threshold size may be predetermined in an image encoding device. For example, the threshold size may be represented by c×d, where c and d are 2, 4, 8, 16, 32, 64 or more, and c and d may be the same or different. Alternatively, an image encoding device may determine an optimal threshold size in consideration of encoding efficiency, and encode the threshold size.

Next, a method of encoding/decoding a block using a multi-intra-prediction mode will be described in detail.

An encoding block may be partitioned into at least one prediction block, and each prediction block may be partitioned into at least one partial block (or a prediction partial block) through an additional partitioning procedure. Here, each partial block may be encoded using different intra-prediction modes. That is, an encoding block or a prediction block may be partitioned into a plurality of prediction blocks or a plurality of partial blocks using a multi-intra-prediction mode (or a multi-mode). A prediction block may be partitioned into a plurality of partial blocks according to a predetermined pattern. Here, a partitioning shape of a prediction block may be predetermined and used in an image encoding device and an image decoding device.

Hereinafter, encoding/decoding of multi-intra-prediction mode information will be described in detail with reference to the drawings.

Figure 19:
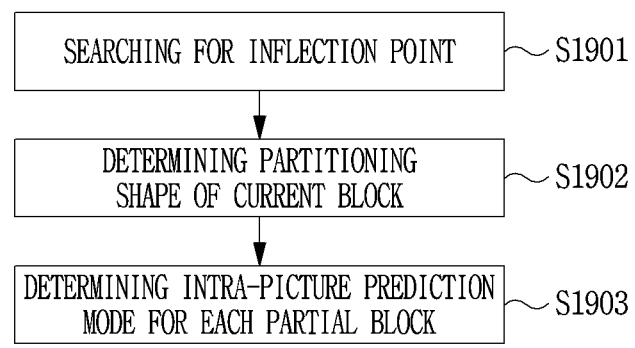
FIG. 19 is a flowchart illustrating a procedure of determining whether to use a multi-intra-prediction mode in an encoding procedure.

FIG. 19 is a flowchart illustrating a procedure of determining whether to use a multi-intra-prediction mode in an encoding procedure. In this embodiment, it is assumed that a current block represents a prediction block that is encoded in a current intra-prediction mode. In some cases, a current block may be an encoding block, a transform block or a partial block generated by partitioning a prediction block.

First, an encoding device may search for a point (hereinafter, referred to as an 'inflection point') at which a pixel value among adjacent pixels adjacent to the current block changes significantly (S601). The inflection point may mean a point where the pixel value change between an adjacent pixel and a neighboring pixel neighboring the adjacent pixel is equal to or greater than a predetermined threshold value, or a point where the pixel value change between an adjacent pixel and a neighboring pixel neighboring the adjacent pixel is greatest.

Figure 20:
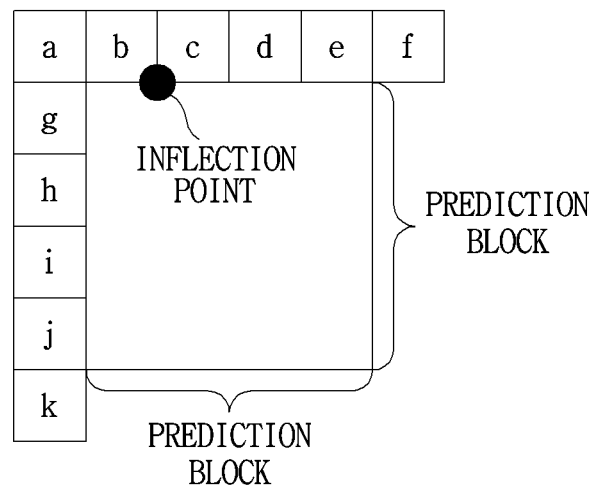
FIG. 20 is a diagram for explaining an example of searching for an inflection point.

FIG. 20 is a diagram for explaining an example of searching for an inflection point. For convenience of explanation, it is assumed that a current block is a prediction block of 4×4 size.

An encoding device may calculate a degree of pixel value change (hereinafter, referred to as an 'inflection value') for each of adjacent pixels adjacent to a current block. The inflection value may be calculated based on a change amount (or a differential value) between an adjacent pixel adjacent to a current block and a neighboring pixel neighboring the adjacent pixel, or a change amount (or a differential value) between neighboring pixels neighboring the adjacent pixel.

Here, adjacent pixels adjacent to a current block include at least one of a pixel adjacent to a top boundary of the current block, a pixel adjacent to a left boundary of the current block and a pixel adjacent to a corner (e.g., left top corner, right top corner and left bottom corner) of the current block. For example, in the example shown in FIG. 20, pixels a to k are exemplified as adjacent pixels of the current block.

For additional example, an encoding device may calculate an inflection value for the remaining adjacent pixels excluding pixels (e.g., at least one of a pixel adjacent to left top corner of the current block, a pixel adjacent to left bottom corner of the current block, and a pixel adjacent to right top corner of the current block) adjacent to a corner of the current block from adjacent pixels adjacent to the current block. Alternatively, the encoding device may calculate an inflection value for the remaining adjacent pixels excluding the rightmost pixel or the bottommost pixel among the adjacent pixels adjacent to the current block. For example, in the example shown in FIG. 20, the encoding device may calculate an inflection value for the remaining pixels except for f and k pixels among the adjacent pixels a to k.

The number or range of adjacent pixels may vary depending on a size and shape of the current prediction block. Accordingly, depending on the size and shape of the current block, the number or range of adjacent pixels subjected to calculating the inflection value may also vary.

Equation 4 shows an example of a calculating method of an inflection value.

[Equation 4]

IF (ADJACENT PIXEL == LEFT TOP ADJACENT PIXEL)

INFLECTION VALUE =

|(−1 * BOTTOM PIXEL OF CURRENT ADJACENT PIXEL) + (1 * RIGHT PIXEL OF CURRENT ADJACENT PIXEL)|

ELSE IF (ADJACENT PIXEL == LEFT ADJACENT PIXEL)

INFLECTION VALUE =

|(−1 * TOP PIXEL OF CURRENT ADJACENT PIXEL) + (1 * BOTTOM PIXEL OF CURRENT ADJACENT PIXEL)|

ELSE IF (ADJACENT PIXEL == TOP ADJACENT PIXEL)

INFLECTION VALUE =

|(−1 * LEFT PIXEL OF CURRENT ADJACENT PIXEL) + (1 * RIGHT PIXEL OF CURRENT ADJACENT PIXEL)|

ELSE

INFLECTION VALUE = 0

In Equation 4, the current adjacent pixel indicates an adjacent pixel subjected to calculation of an inflection value among adjacent pixels adjacent to the current block. The inflection value of the current adjacent pixel may be calculated as a value obtained by applying absolute value to the difference between neighboring adjacent pixels neighboring the current adjacent pixel. For example, the inflection value of the adjacent pixels (e.g., pixels 'b to e' in FIG. 20) adjacent to a top side of the current block may be calculated based on a difference between an adjacent pixel neighboring a left side of the adjacent pixel and an adjacent pixel neighboring a right side of the adjacent pixel. The inflection value of the adjacent pixels (e.g., pixels 'g to j' in FIG. 20) adjacent to a left side of the current block may be calculated based on a difference between an adjacent pixel neighboring a top side of the adjacent pixel and an adjacent pixel neighboring a bottom side of the adjacent pixel. The inflection value of the adjacent pixel (e.g., pixel 'a' in FIG. 20) adjacent to a left top corner of the current block may be calculated based on a difference between an adjacent pixel neighboring a bottom side of the adjacent pixel and an adjacent pixel neighboring a right side of the adjacent pixel.

As described above, some of the adjacent pixels of the current block (e.g., pixels f and k not adjacent to the boundary of the current block among the adjacent pixels) may be excluded from the calculation of the inflection value. An inflection value of adjacent pixels that are excluded from the calculation of the inflection value among adjacent pixels of the current block may be set to a predetermined value (e.g., 0).

When the calculation of the inflection value for the adjacent pixels is completed, the encoding device may select an inflection point based on the calculated inflection value. For example, the encoding device may set an adjacent pixel having a largest inflection value or an adjacent pixel having a largest inflection value among adjacent pixels having the inflection value equal to or greater than a threshold value as an inflection point. For example, in the example shown in FIG. 20, when the inflection value of the adjacent pixel b is the maximum, the encoding device may set the point '0' shown in FIG. 20 as the inflection point.

When there are a plurality of adjacent pixels having the same maximum inflection value, the encoding device may recalculate inflection values for the plurality of adjacent pixels, or based on a predetermined priority, one of the adjacent pixels may be selected as an inflection point.

For example, when there are a plurality of adjacent pixels having the same maximum inflection value, the encoding device may recalculate inflection values of those inflection points, with adjusting the number or position of adjacent pixels used for recalculating the inflection values. For example, the encoding device may increase the number of neighboring pixels adjacent to the adjacent pixels in bidirectional (or unidirectional) by one when recalculating the inflection values of the adjacent pixels. Accordingly, when the adjacent pixels having the maximum inflection value are adjacent pixels adjacent to the top side of the current block, using two adjacent pixels neighboring the left of the adjacent pixel and two adjacent pixels neighboring the right of the adjacent pixel, the inflection value of the adjacent pixels may be recalculated.

For additional example, when there are a plurality of adjacent pixels having the same maximum inflection value, the encoding device may select an adjacent pixel close to a pixel at a specific position as an inflection point. For example, the encoding device may give a higher priority to an inflection point closer to a left top adjacent pixel of the current block.

For additional example, when there are a plurality of adjacent pixels having the same maximum inflection value, the encoding device may recalculate inflection values of the inflection points and determines an inflection point based on the recalculated inflection value, and when there are a plurality of adjacent pixels having the maximum inflection value even after recalculating the inflection value, the encoding device may select an inflection point based on priority.

In the above-described example, it is described that an inflection point may be determined based on adjacent pixels adjacent to the current block and adjacent pixels neighboring the adjacent pixels. In addition to the example described above, the inflection point may be determined based on encoding parameters of adjacent blocks neighboring the current block. Here, the encoding parameters are parameters used for encoding adjacent blocks, and may include prediction related information such as an intra-prediction mode, a motion vector, and the like. For example, a boundary of an adjacent block may be set as an inflection point in a case where a difference of the intra-prediction modes between adjacent blocks neighboring the current block is equal to or greater than a predetermined threshold value, a difference of motion vectors between adjacent blocks neighboring the current block is equal to or greater than a predetermined threshold value, or the like. Accordingly, when the difference of encoding parameters between adjacent blocks is large, it may be predicted that a sharp change occurs at the boundary of the adjacent block, and thus encoding/decoding efficiency may be improved by using the boundary of the adjacent block as an inflection point. The decoding device may also determine an inflection point using the encoding parameters of the adjacent blocks.

When the inflection point is determined, the encoding device may determine a partitioning shape of the current block based on the inflection point (S602).

Figure 21:
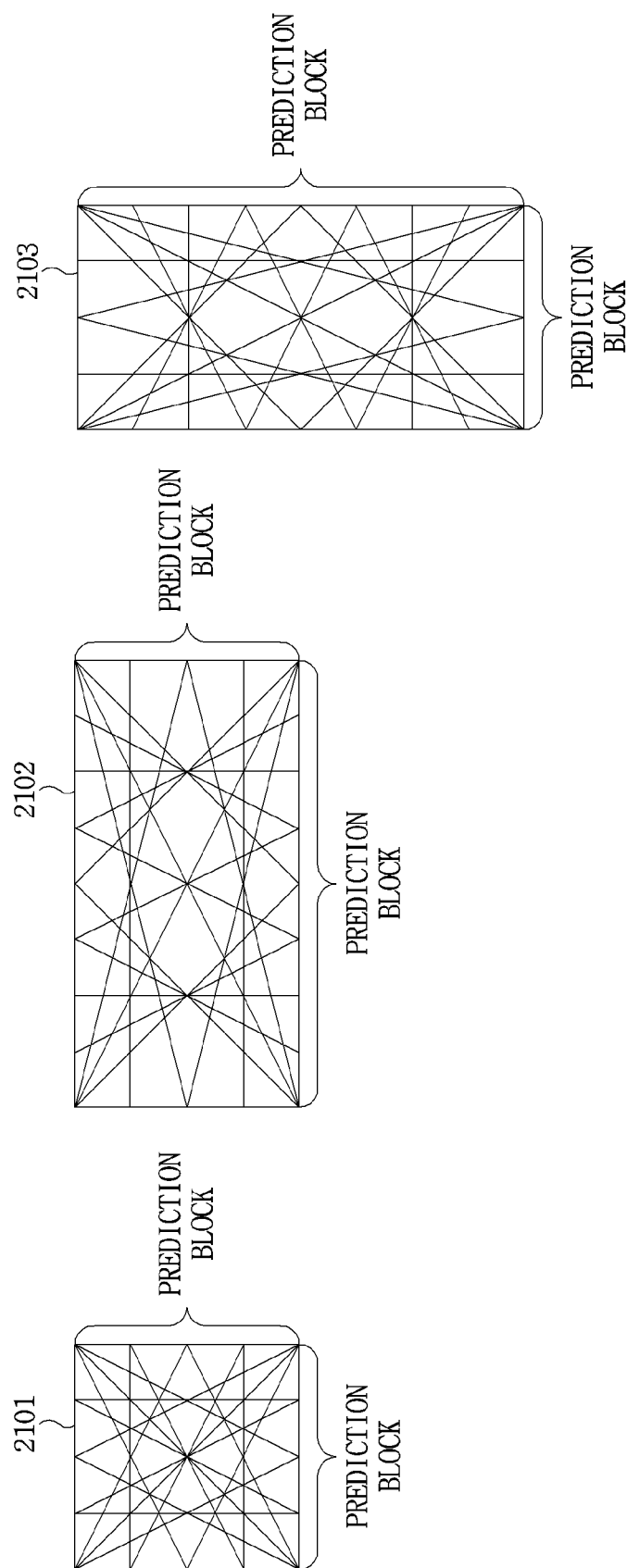
FIG. 21 is a diagram illustrating a partitioning shape according to a shape of a current block.

FIG. 21 is a diagram illustrating a partitioning shape according to a shape of a current block.

In the example shown in FIG. 21, the current block may be partitioned into two or more partial blocks, according to at least one reference line. Here, partial blocks generated by partitioning the current block may have a triangular or trapezoidal shape as well as a non-square shape. In FIG. 21, the reference numeral 2101 is an example that there are 18 partitioning lines (or 18 partitioning shapes) when the current block is a square, and the reference numerals 2102 and 2103 in FIG. 21 indicate that there are 20 partitioning lines (or 20 partitioning shapes) when the current block is a non-square. However, the partitioning shape of the current block is not limited to the illustrated example. In addition to what is shown, various shapes of diagonal partitioning or bisectional partitioning may be applied.

The encoding device may select a partitioning line having a determined inflection point as a starting point or a partitioning line having a starting point closest to the determined inflection point, and may partition the current block according to the selected partitioning line. For example, when the position of the inflection point does not match with a left or top starting point of the partitioning line, the encoding device may change the position of the inflection point to the starting point of the closest partitioning line.

After that, the encoding device may calculate slope information of the pixel adjacent to the inflection point in order to determine in which shape the current block is partitioned from the inflection point.

For example, FIG. 22 is a diagram for explaining an example of calculating slope information of an adjacent pixel. For convenience of explanation, it is assumed that the size of the current block is 4×4 and the inflection point is b1.

The encoding device may calculate the slope information using N pixels selected based on the inflection point. For example, as in the example shown in FIG. 22, the encoding device may configure a 3×3 block including the inflection point b1 and calculate the slope information based on the pixels included in the configured 3×3 block.

When the inflection point of the current block is an adjacent pixel located at a top side of the current block, the inflection point may be included in the bottommost row of the 3×3 block. In addition, when the inflection point of the current block is an adjacent pixel located at a left side of the current block, the inflection point may be included in the rightmost column of the 3×3 block. That is, when the inflection point of the current block exists at a top side, a 3×3 block may be configured mostly with the adjacent pixels of the inflection point and the pixels located at the top side of the inflection point. In addition, when the inflection point of the current block exists at a left side, a 3×3 block may be configured mostly with the adjacent pixels of the inflection point and the pixels located at the left side of the inflection point.

The encoding device may calculate horizontal directional slope and vertical directional slope using adjacent pixels neighboring the inflection point, and based on the horizontal directional slope and the vertical directional slope, may calculate slope information for the current block. For example, Equation 5 shows a series of procedure for calculating slope information.

$$f_x(x, y) = I(x + 1, y) - I(x - 1, y)$$

$$f_y(x, y) = I(x, y + 1) - I(x, y - 1)$$

$$\theta_{(x,y)} = \tan^{-1} \frac{f_y(x, y)}{f_x(x, y)}$$

[Equation 5]

In Equation (5), $f_x(x, y)$ represents a degree of slope in a horizontal direction, and $f_y(x, y)$ represents a degree of slope in a vertical direction. A slope of a current block may be obtained by applying arctangent for a slope value in the vertical direction to a slope value in the horizontal direction. A contour direction of the current block may be identified through the slope value of the current block.

In the above example, the slope value may be calculated based on adjacent pixels adjacent to the current block and adjacent pixels neighboring the adjacent pixels. For additional example, a slope of the current block may be determined based on the encoding parameters of adjacent blocks neighboring the current block. For example, the slope value may be determined based on intra-prediction modes (or intra-prediction mode angles) of adjacent blocks neighboring the inflection point, motion vectors of adjacent blocks neighboring the inflection point, or the like. When the inflection point is located at a boundary between adjacent blocks, the encoding device may encode index information indicating encoding parameters of which adjacent block among adjacent blocks located at the inflection point is used for determining the slope value. Here, the index information may be information indicating one of the adjacent blocks.

When a slope of a current block is calculated, an encoding device may determine an optimal partitioning shape for the current block in consideration of a position of an inflection point and a degree of slope. Here, the optimal partitioning shape may be one using a partitioning line having a slope angle identical to the slope angle of the current block among partitioning lines having a start point of the inflection point of the current block, or a partitioning line having a slope angle most similar to the slope angle of the current block (i.e., a partitioning line having a slope angle with a minimum difference from the slope angle of the current block). Here, when there are a plurality of partitioning shapes having the slope angle most similar to the slope angle of the current block, the encoding device may select a partitioning shape having a higher priority according to a predetermined priority.

An encoding device may encode information for determining a partitioning shape of a current block, and may transmit the encoded information to a decoding device through a bitstream. The information for determining the partitioning shape of the current block may be encoded through a prediction block unit or an upper header. Here, the upper header may mean an encoding block layer, a slice layer, a picture layer, a sequence layer, a video layer, and the like.

The information for determining the partitioning shape of the current block may include at least one of an index for identifying a partitioning shape of a current block, a position of an inflection point or slope information. For example, the position of the inflection point may be encoded through a prediction block unit or an upper header and transmitted to a decoding device.

For additional example, a decoding device may determine a partitioning shape of a current block in the same manner as the encoding device. For example, the decoding device may derive an inflection point based on a pixel value change amount between adjacent blocks, calculate slope information using N pixels around the derived inflection point, and then determine one of a predetermined partitioning patterns as a partitioning shape of the current block.

Here, the encoding device may encode information on whether to use the multi-intra-prediction mode (i.e., whether to perform intra-prediction by partitioning one current block into a plurality of partial blocks), and transmit the encoded information through a bitstream. The decoding device may encode the information and partition the current block into a plurality of partial blocks only when the information indicates that intra-prediction is to be performed by partitioning the current block into a plurality of partial blocks.

When a partitioning shape for a current block is determined, an encoding device may determine an intra-prediction mode for each partial block included in the current block (S603). Here, the encoding device may allocate different intra-prediction modes to each partial block.

Based on a Rate Distortion-Cost (RD-cost) value calculated by performing Rate Distortion Optimization (RDO) for each intra-prediction mode for a partial block, an encoding device may determine an intra-prediction mode for each partial block included in a current block. For example, the encoding device may determine the intra-prediction mode in which the RD-cost value is minimum for each partial block included in the current block, as the intra-prediction mode of each partial block.

In performing RDO, the encoding device may calculate RD-cost value for all available intra-prediction modes, or may calculate RD-cost value for a part of intra-prediction modes. The part of intra-prediction modes may be set and used the same in the image encoding device and the image decoding device. Alternatively, the part of intra-prediction modes may include only an intra-prediction mode using only reference pixels adjacent to the current block.

For additional example, the part of intra-prediction modes may include at least one of an intra-prediction mode of an adjacent block neighboring to the current block and a predetermined additional intra-prediction mode. For example, when the intra-prediction mode of the adjacent block is a non-directional mode, RDO may be performed from candidates of all the non-directional modes, some directional prediction modes having high selection frequencies (e.g., a vertical directional prediction mode, a horizontal directional prediction mode, etc.), and the like. Alternatively, when the intra-prediction mode of the adjacent block is a directional mode, RDO may be performed from candidates of all the non-directional modes, an intra-prediction mode of the adjacent block, an intra-prediction mode of the adjacent block, an intra-prediction mode having a direction similar to the intra-prediction mode of the adjacent block (e.g., an intra-prediction mode in which the difference from an intra-prediction mode of the adjacent block is equal to or less than a threshold value), and the like.

An encoding device may perform intra-prediction on a current block using a selected intra-prediction mode. Here, when the current block is partitioned into partial blocks by diagonal lines, the partitioning lines may not match to a pixel boundary, and overlapping pixels (i.e., overlapping region) between partial blocks may appear.

Figure 23:
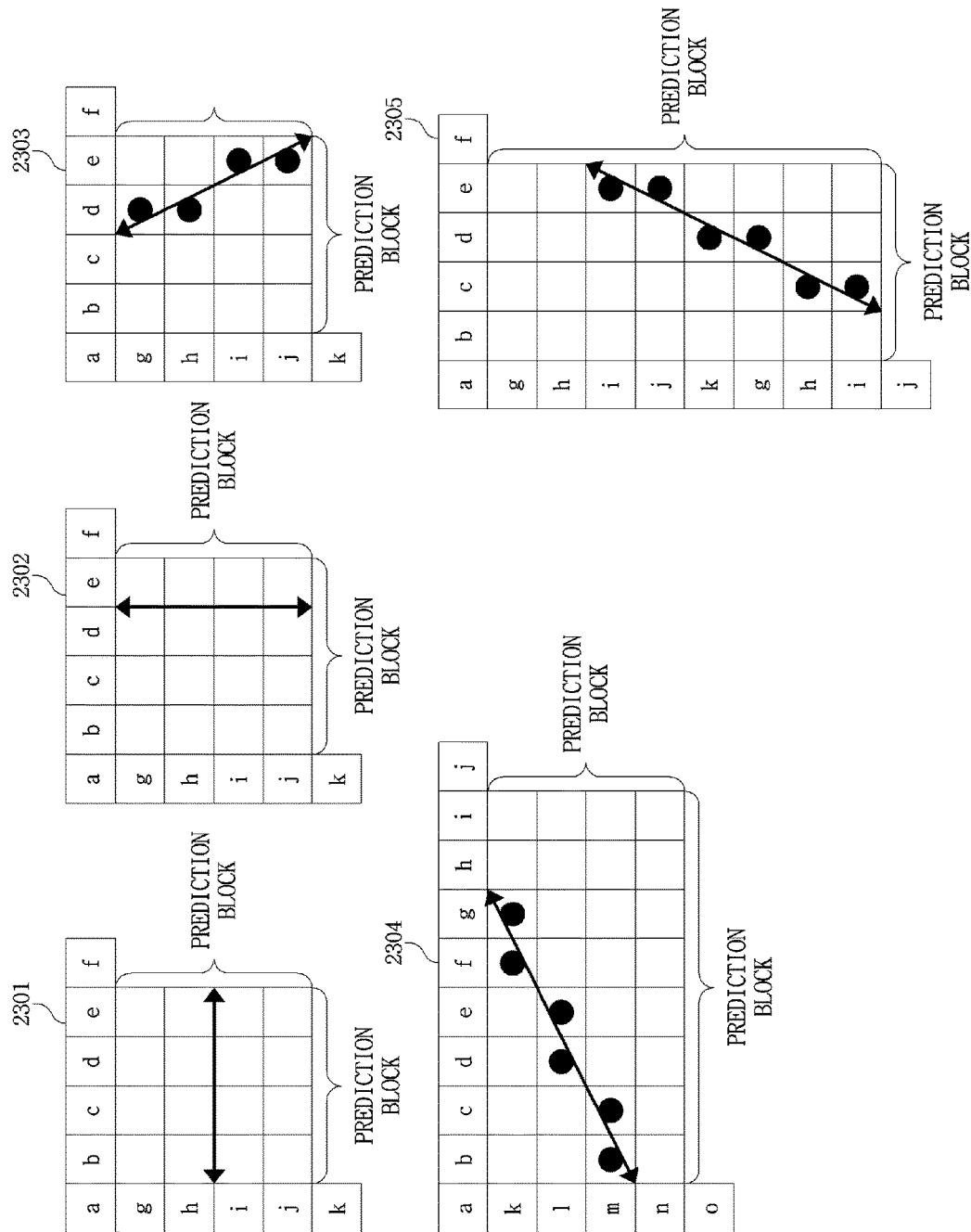
FIG. 23 is a diagram illustrating an example in which an overlapping region is generated according to a partitioning shape of a current block.

For example, FIG. 23 is a diagram illustrating an example in which an overlapping region is generated according to a partitioning shape of a current block.

In the case of the blocks corresponding to the reference numerals 2301 and 2302 shown in FIG. 23, since the partitioning line matches to the pixel boundaries, overlapping regions between partial blocks do not occur. However, in the case of the blocks corresponding to the reference numerals 2303 to 2305, since there are portions where the partitioning line does not match to the pixel boundaries (i.e., portions where the partitioning line passes through a pixel), it may be considered that overlapping pixels (i.e., overlapping regions) between partial blocks exist.

As such, when there are overlapping regions between partial blocks, a prediction value of a pixel included in an overlapping region may be obtained by an average of prediction values generated as the intra-prediction results of the partial blocks including the overlapping region, linear interpolation of the prediction values, or the like. For example, assuming that the current block is partitioned into a first partial block and a second partial block, a prediction value of a pixel commonly included in the first partial block and the second partial block may be determined as an average value of a first prediction value calculated using an intra-prediction mode of the first partial block and a second prediction value calculated using an intra-prediction mode of the second partial block, or a value of linear interpolation of the first prediction value and the second prediction value.

For additional example, a prediction value of a pixel included in an overlapping region may be generated using an intra-prediction mode of any one of partial blocks including the overlapping region. Here, which block among the partial blocks is used may be determined based on a predetermined priority between partial blocks, a predetermined priority between intra-prediction modes, a position of a pixel included in an overlapping region, or the like. For example, a prediction value of a pixel included in an overlapping region may be generated using an intra-prediction mode having a higher predetermined priority among intra-prediction modes of partial blocks including the overlapping region.

Next, encoding of an intra-prediction mode for each partial block in an encoding device will be described in detail.

Figure 24:
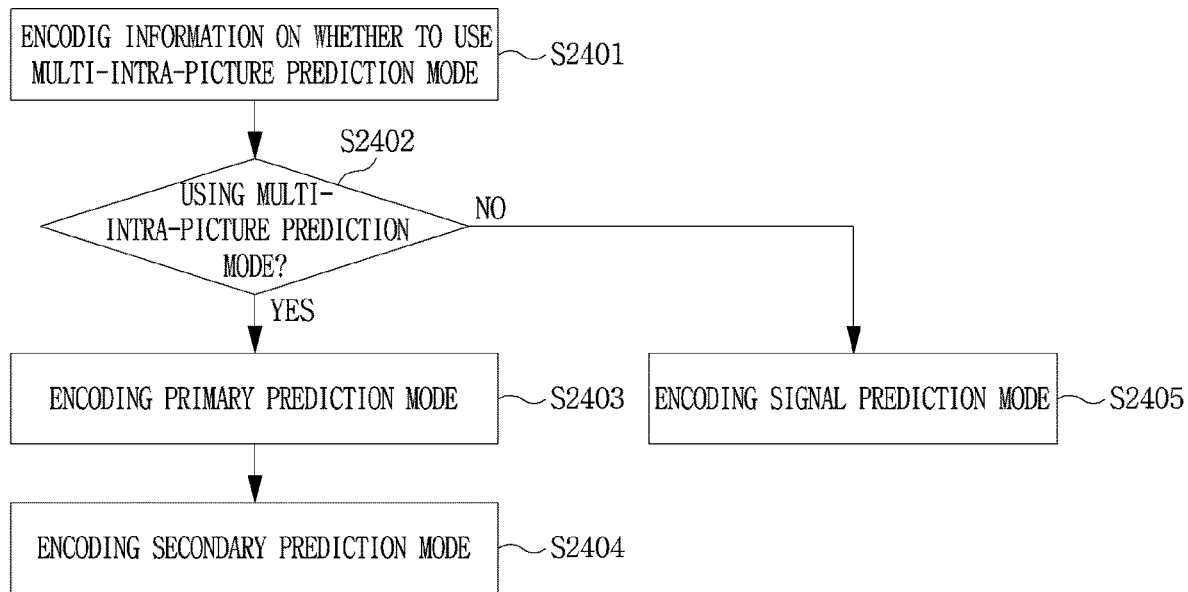
FIG. 24 is a flowchart illustrating a procedure of encoding an intra-prediction mode of a partial block.

FIG. 24 is a flowchart illustrating a procedure of encoding an intra-prediction mode of a partial block. For convenience of explanation, the intra-prediction modes of the partial blocks are classified into a primary prediction mode and a secondary prediction mode. Herein, the primary prediction mode may indicate an intra-prediction mode of one of the partial blocks, and the secondary prediction mode may indicate an intra-prediction mode of another partial block of the partial blocks. Alternatively, the primary prediction mode and the secondary prediction mode may be determined according to a priority for the intra-prediction modes, a size of a partial block, a position of a partial block, a size of a partial block, or the like. The secondary prediction mode may be determined to be an intra-prediction mode different from the primary prediction mode.

First, an encoding device may encode operation information for multi-intra-prediction (S1101). Here, the multi-mode operation information indicates whether using a single intra-prediction mode for the current block is optimal or using a plurality of intra-prediction modes is optimal.

When the multi-intra-prediction mode is true (S1102), the encoding device may encode an intra-prediction mode determined as a primary prediction mode (S1103), and then encode an intra prediction mode determined as a secondary prediction mode (S1104). The primary prediction mode may be encoded through an encoding procedure using MPM (Most Probable Mode) candidates, or may be encoded without using MPM candidates. The secondary prediction mode may be encoded through an encoding procedure using MPM candidates, or may be encoded without using MPM candidates.

The encoding device may encode a differential value between the primary prediction mode and the secondary prediction mode. For example, the encoding device may encode the primary prediction mode using MPM candidates, and may encode the differential value between the primary prediction mode and the secondary prediction mode. In this case, a decoding device may derive the primary prediction mode using MPM candidates, and obtain the secondary prediction mode through the differential value between the primary prediction mode and the secondary prediction mode.

When the multi-intra-prediction mode is false (S1102), the encoding device may encode a single intra-prediction mode for the current block (S1105). For example, the encoding device may encode an intra-prediction mode for the current block using MPM candidates.

Figure 25:
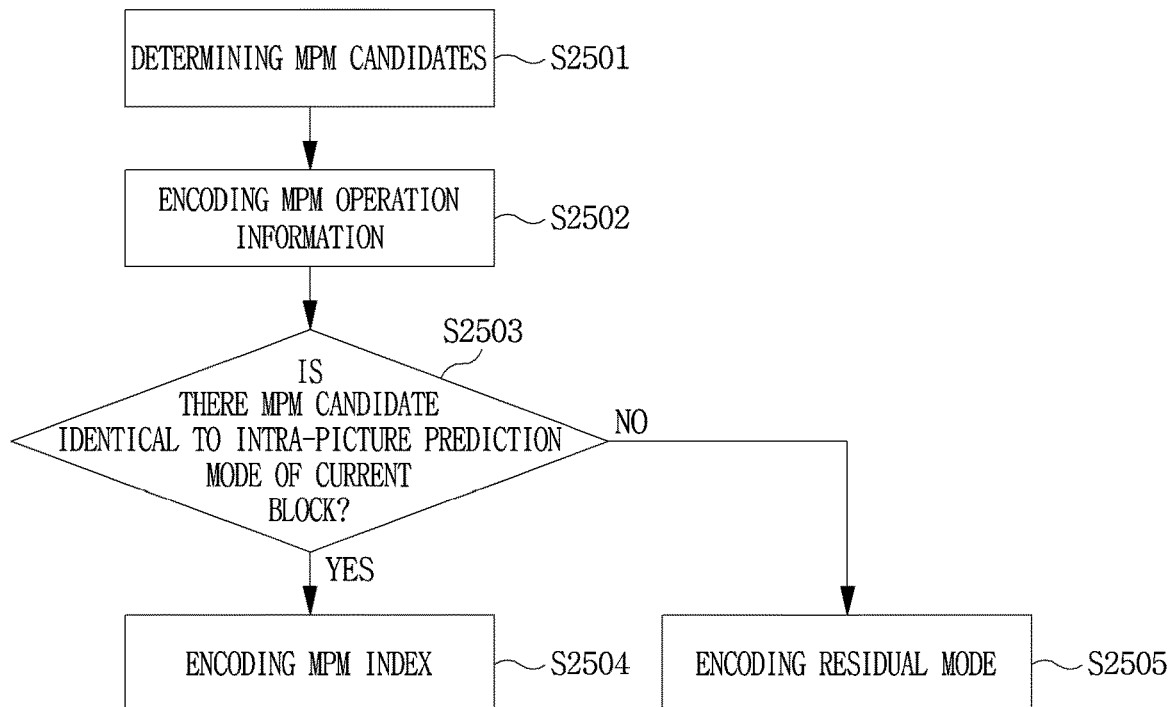
FIG. 25 is a flowchart illustrating a method of encoding an intra-prediction mode using MPM candidates.

Referring to FIG. 25, encoding of an intra-prediction mode for a current block using MPM candidates will be described in detail FIG. 25 is a flowchart illustrating a method of encoding an intra-prediction mode using MPM candidates. In this embodiment, the intra-prediction mode of the current block may mean one of the primary prediction mode, the secondary prediction mode or the single prediction mode.

Referring to FIG. 25, first, an encoding device may determine MPM candidates for a current block (S1201). The encoding device may determine the MPM candidates of the current block based on intra-prediction modes of neighboring blocks neighboring the current block.

Figures 26, 27:
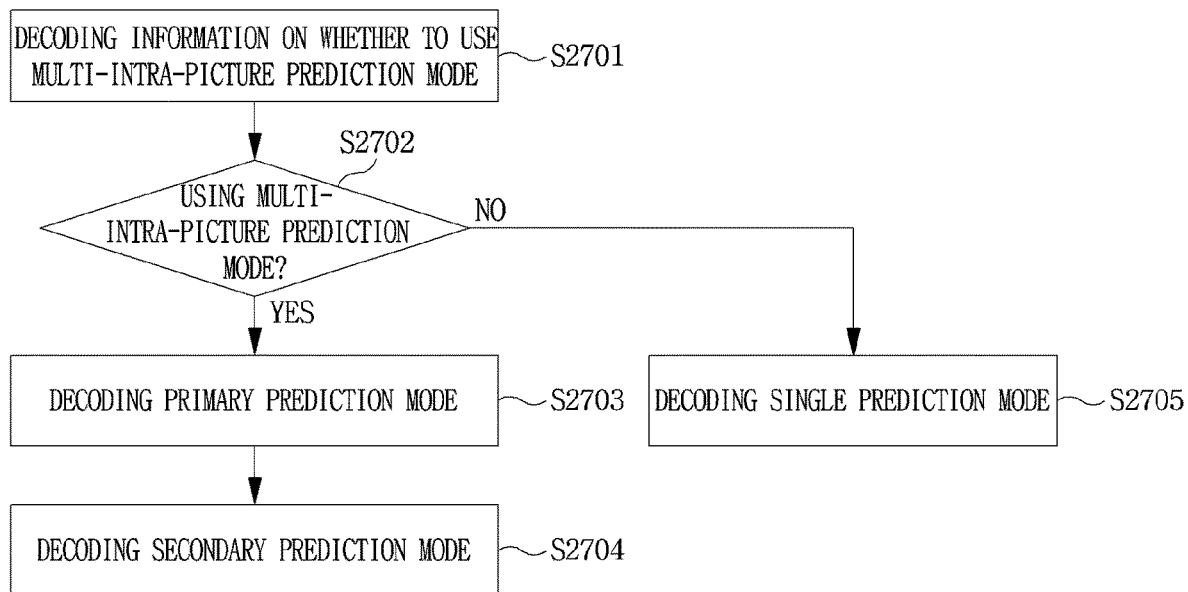
FIG. 26 is a diagram illustrating determination of an MPM candidate of a current block.
FIG. 27 is a flowchart illustrating a method of decoding an intra-prediction mode of a current block.

For example, FIG. 26 is a diagram illustrating determination of an MPM candidate of a current block. In FIG. 26, L may indicate an intra-prediction mode with a highest frequency of use among intra-prediction modes of left neighboring blocks adjacent to a left side of the current block, A may indicate an intra-prediction mode with a highest frequency of use among intra-prediction modes of top neighboring blocks adjacent to a top side of the current block. Alternatively, L may indicate an intra-prediction mode of a left neighboring block at a specific position, and A may indicate an intra-prediction mode of a top neighboring block at a specific position.

In FIG. 26, it is shown that the MPM candidates of the current block are three, and the three MPM candidates may include at least one of L, A, the intra-prediction modes (i.e., L−1 and L+1) having similar direction to L, non-directional mode (Planar, DC) and a predetermined directional mode (vertical mode). However, the present invention is not limited to the illustrated example, and MPM candidates of the current block may be generated by a method different from that shown. For example, MPM candidates of the current block may include more than three.

When neighboring blocks neighboring the current block are coded in multi-intra-prediction mode, the MPM candidates of the current block may be determined by considering all of the multi-intra-prediction modes of the neighboring blocks, or may be determined by considering only one of the multi-intra-prediction modes of the neighboring blocks. For example, the MPM candidates of the current block may be determined considering the primary prediction mode among the multi-intra-prediction modes of the neighboring blocks.

Alternatively, the MPM candidates for a primary prediction mode of the current block may be determined using a primary prediction mode of the neighboring block, and the MPM candidates for a secondary prediction mode of the current block may be determined using a secondary prediction mode of the neighboring block.

The encoding device may determine whether there is an MPM candidate identical to an intra-prediction mode of the current block, and may encode operation information according to the determination result (S1202). Here, the operation information may be a 1-bit flag (e.g., an MPM flag). For example, when there is an MPM candidate identical to the intra-prediction mode of the current block, the encoding device may encode the MPM flag to 'true'. When there is no MPM candidate identical to the intra-prediction mode of the current block, the encoding device may encode the MPM flag to 'false'.

When there is an MPM candidate identical to the intra-prediction mode of the current block (S1203), the encoding device may encode index information specifying the MPM candidate identical to the intra-prediction mode of the current block (S1204).

When there is no MPM candidate identical to the intra-prediction mode of the current block (S1203), the encoding device may encode a residual mode indicating an optimal intra-prediction mode for the current block among the residual intra-prediction modes excluding the MPM candidate (S1205). Specifically, the encoding device may encode the residual mode by allocating as many bits as the number of residual intra-prediction modes obtained by subtracting the number of MPM candidates from a total intra-prediction modes (or intra-prediction modes available for the current block).

The secondary prediction mode is set to a value different from the primary prediction mode, and a residual mode for the secondary prediction mode may be encoded based on the residual intra-prediction modes excluding the MPM candidates and the primary prediction mode.

Next, a method for decoding an optimal intra-prediction mode in a decoding device will be described.

FIG. 27 is a flowchart illustrating a method of decoding an intra-prediction mode of a current block.

Referring to FIG. 27, first, the decoding device may decode multi-mode operation information from a bitstream (S1401). Here, the multi-mode operation information may indicate whether the current block is encoded using the multi-intra-prediction mode.

When it is determined that the current block is encoded using the multi-intra-prediction mode (S1402), the decoding device may partition the current block into a plurality of partial blocks. Here, the decoding device may partition the current block based on block partitioning pattern information signaled from the encoding device, or may calculate an inflection point and slope, select a partitioning pattern corresponding to the calculated inflection point and slope, and then partition the current block.

When the current block is partitioned into a plurality of partial blocks, the decoding device may decode a primary prediction mode for the current block (S1403), and then decode a secondary prediction mode (S1404). As described in the encoding procedure, the primary prediction mode or the secondary prediction mode may be decoded using MPM candidates, or may be decoded without using MPM candidates. Alternatively, after decoding the primary prediction mode, the secondary prediction mode may be obtained based on a differential value between the primary prediction mode and the secondary prediction mode.

When it is determined that the current block is encoded without using multi-intra-prediction mode, the decoding device may decode a single intra-prediction mode for the current block (S1405). Here, the single intra-prediction mode for the current block may be decoded using MPM candidates.

Figure 28:
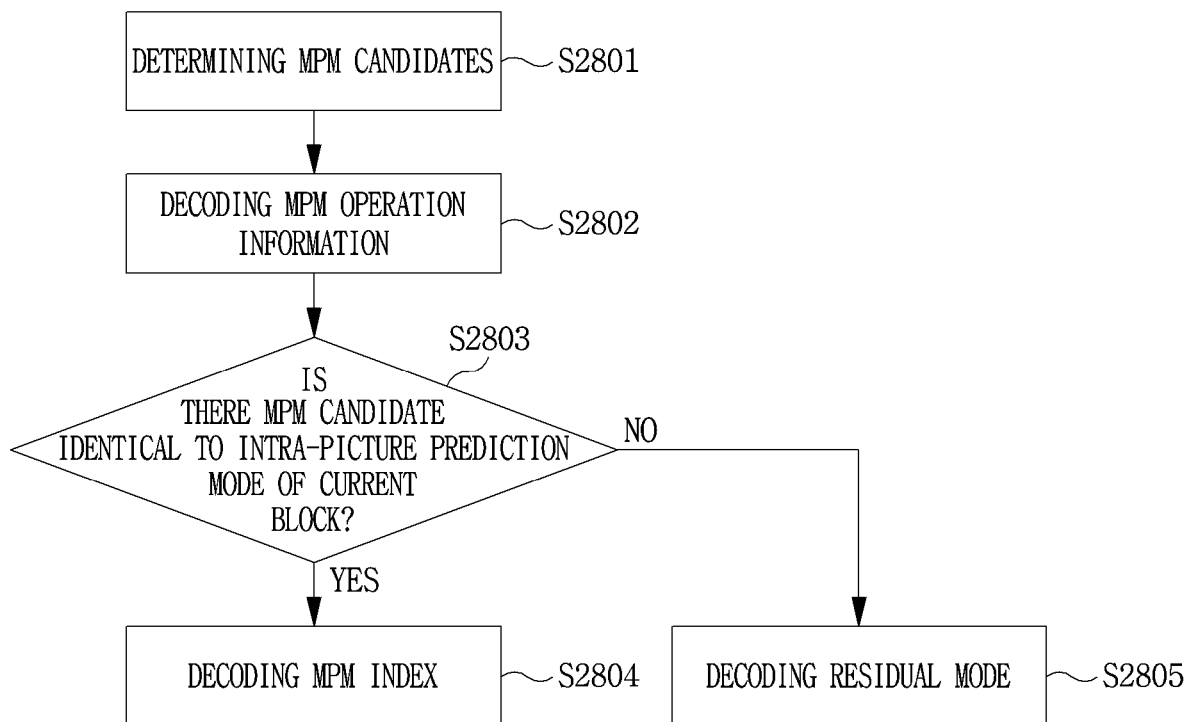
FIG. 28 is a flowchart illustrating a method of decoding an intra-prediction mode using MPM candidates.

FIG. 28 is a flowchart illustrating a method of decoding an intra-prediction mode using MPM candidates. In this embodiment, the intra-prediction mode of the current block may mean one of the primary prediction mode, the secondary prediction mode or the single prediction mode.

First, a decoding device may determine MPM candidates for a current block (S1501). The decoding device may determine the MPM candidates of the current block based on intra-prediction modes of neighboring blocks neighboring the current block. The generation of the MPM candidates of the current block has been described in detail with reference to FIG. 26, and a detailed description thereof will be omitted.

Thereafter, the decoding device may decode information indicating whether there is an MPM candidate identical to the intra-prediction mode of the current block (S1502). The information may be a 1-bit flag, but is not limited thereto.

When it is determined that there is an MPM candidate identical to the intra-prediction mode of the current block (S1503), the decoding device may decode information (e.g., MPM index information) specifying the MPM candidate identical to the intra-prediction mode of the current block (S1504). In this case, the intra-prediction mode of the current block may be determined as the intra prediction mode specified by the MPM index information.

In addition, when it is determined that there is no MPM candidate identical to the intra-prediction mode of the current block (S1503), the decoding device may decode residual mode information (S1505), and based on the decoded residual mode information, determine the intra-prediction mode for the current block. Here, the residual mode information may be encoded by excluding MPM candidates from the intra-prediction modes available for the current block.

Although the exemplary methods of this disclosure are represented by a series of steps for clarity of explanation, they are not intended to limit the order in which the steps are performed, and if necessary, each step may be performed simultaneously or in a different order. In order to implement the method according to the present disclosure, it is possible to include other steps to the illustrative steps additionally, exclude some steps and include remaining steps, or exclude some steps and include additional steps.

The various embodiments of the disclosure are not intended to be exhaustive of all possible combination, but rather to illustrate representative aspects of the disclosure, and the features described in the various embodiments may be applied independently or in a combination of two or more.

In addition, various embodiments of the present disclosure may be implemented by hardware, firmware, software, or a combination thereof. A case of hardware implementation may be performed by one or more application specific integrated circuits (ASICs), digital signal processors (DSPs), digital signal processing devices (DSPDs), programmable logic devices (PLDs), field programmable gate arrays (FPGAs), a general processor, a controller, a microcontroller, a microprocessor, and the like.

The scope of the present disclosure is to encompass software or machine-executable instructions (e.g., operating system, applications, firmware, instructions, and the like) by which operations according to method of various embodiments are executed on a device or a computer, and non-transitory computer-readable media executable on the device or the computer, on which such software or instructions are stored.

INDUSTRIAL APPLICABILITY

The present invention may be applied to encoding/decoding image.

The invention claimed is:

1. A method for decoding a video signal with a decoding apparatus, comprising:
   generating a candidate list of a current block based on neighboring blocks adjacent to the current block, the neighboring blocks including a top neighboring block and a left neighboring block;
   determining, with the decoding apparatus, a reference line for dividing the current block, the reference line being determined to be one of a plurality of candidate reference lines, each of the candidate reference lines being distinguished based on at least one of a predetermined slope or a position;
   dividing, with the decoding apparatus, the current block into two or more partitions, based on the determined reference line; and
   predicting, with the decoding apparatus, the current block based on the candidate list and prediction information for each of the partitions,
   wherein a shape of at least one of the divided partitions is a triangle,
   wherein the prediction information comprises first prediction information for predicting a first partition among the partitions and second prediction information for predicting a second partition among the partitions,
   wherein the first prediction information for predicting the first partition is determined based on first index information, the first index information specifying one of a plurality of candidates in the candidate list and being signaled by a bitstream, and
   wherein the second prediction information for predicting the second partition is determined based on second index information, the second index information specifying one of the plurality of candidates in the candidate list and being signaled by a bitstream.

2. The method of claim 1, wherein the reference line is determined based on two positions on sides of the current block, one of two positions being located at a different side from the other of two positions.

3. The method of claim 2, wherein the reference line includes a position of a right-top sample of the current block and a bottom-left sample of the current block.

4. The method of claim 1, wherein the reference line is determined based on first information, the first information being encoded to determine a division type of the current block.

5. The method of claim 4, wherein the first information includes information about at least one of the slope or the position of the reference line.

6. The method of claim 1, wherein the current block includes the first partition and the second partition, and
   wherein a prediction value of a boundary region between the first partition and the second partition is obtained by interpolating a first prediction value of the first partition and a second prediction value of the second partition.

7. A method for encoding a video signal with an encoding apparatus, comprising:
   generating a candidate list of a current block based on neighboring blocks adjacent to the current block, the neighboring blocks including a top neighboring block and a left neighboring block;
   determining, with the encoding apparatus, a reference line for dividing a current block, the reference line being determined to be one of a plurality of candidate reference lines, each of the candidate reference lines being distinguished based on at least one of a predetermined slope or a position;
   dividing, with the encoding apparatus, the current block into two or more partitions, based on the determined reference line; and
   predicting, with the encoding apparatus, the current block based on the candidate list and prediction information for each of the partitions,
   wherein a shape of at least one of the divided partitions is a triangle,
   wherein the prediction information comprises first prediction information for predicting a first partition among the partitions and second prediction information for predicting a second partition among the partitions,
   wherein the first prediction information for predicting the first partition is determined based on index information, the index information specifying one of a plurality of candidates in the candidate list and being signaled by a bitstream, and
   wherein the second prediction information for predicting the second partition is determined based on second index information, the second index information specifying one of the plurality of candidates in the candidate list and being signaled by a bitstream.

8. The method of claim 7, wherein the reference line is determined based on two positions on sides of the current block, one of two positions being located at a different side from the other of two positions.

9. The method of claim 8, wherein the reference line includes a position of a right-top sample of the current block and a bottom-left sample of the current block.

10. The method of claim 7, the method further comprising:
    encoding, with the encoding apparatus, first information for determining a division type of the current block, based on the determined reference line.

11. The method of claim 10, wherein the first information includes information about at least one of the slope or the position of the reference line.

12. The method of claim 7, wherein the current block includes the first partition and the second partition, and
    wherein a prediction value of a boundary region between the first partition and the second partition is obtained by interpolating a first prediction value of the first partition and a second prediction value of the second partition.

13. A non-transitory computer-readable medium for storing data associated with a video signal, comprising:
    a data stream stored in the non-transitory computer-readable medium, the data stream comprising first information encoded to determine a division type of a current block,
    wherein a reference line for dividing the current block is determined, based on the first information, to be one of a plurality of candidate reference lines,
    wherein each of the candidate reference lines is distinguished based on at least one of a predetermined slope or a position,
    wherein the current block is divided, based on the determined reference line, into two or more partitions,
    wherein the current block is predicted, based on a candidate list of the current block and prediction information for each of the partitions, the candidate list of the current block being generated based on neighboring blocks adjacent to the current block, and the neighboring blocks including a top neighboring block and a left neighboring block, wherein a shape of at least one of the divided partitions is a triangle, wherein the prediction information comprises first prediction information for predicting a first partition among the partitions and second prediction information for predicting a second partition among the partitions, wherein the first prediction information for predicting the first partition is determined based on index information, the index information specifying one of a plurality of candidates in the candidate list and being signaled by a bitstream, and wherein the second prediction information for predicting the second partition is determined based on second index information, the second index information specifying one of the plurality of candidates in the candidate list and being signaled by a bitstream.

14. The non-transitory computer-readable medium of claim 13, wherein the reference line is determined based on two positions on sides of the current block, one of two positions being located at a different side from the other of two positions.

15. The non-transitory computer-readable medium of claim 14, wherein the reference line includes a position of a right-top sample of the current block and a bottom-left sample of the current block.

16. The non-transitory computer-readable medium of claim 13, wherein the first information includes information about at least one of the slope or the position of the reference line.

17. The non-transitory computer-readable medium of claim 13, wherein the current block includes the first partition and the second partition, and wherein a prediction value of a boundary region between the first partition and the second partition is obtained by interpolating a first prediction value of the first partition and a second prediction value of the second partition.

* * * * *